US012230223B2

(12) United States Patent
Yuasa et al.

(10) Patent No.: US 12,230,223 B2
(45) Date of Patent: Feb. 18, 2025

(54) INFORMATION PROCESSING METHOD, INFORMATION PROCESSING DEVICE, AND NON-TRANSITORY COMPUTER READABLE RECORDING MEDIUM STORING INFORMATION PROCESSING PROGRAM

(71) Applicant: Panasonic Intellectual Property Corporation of America, Torrance, CA (US)

(72) Inventors: Kihiro Yuasa, Kanagawa (JP); Mikiko Matsuo, Nara (JP); Keiichi Toiyama, Osaka (JP); Naomi Tomiyama, Kyoto (JP); Takamichi Matsusako, Tokyo (JP); Megumi Mizoguchi, Kyoto (JP); Kenta Murakami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/430,305

(22) Filed: Feb. 1, 2024

(65) Prior Publication Data
US 2024/0169933 A1    May 23, 2024

Related U.S. Application Data

(63) Continuation of application No. PCT/JP2022/004626, filed on Feb. 7, 2022.

(30) Foreign Application Priority Data

Aug. 4, 2021    (JP) ................. 2021-128542

(51) Int. Cl.
G09G 3/34      (2006.01)
G06Q 10/109    (2023.01)
G09G 5/02      (2006.01)

(52) U.S. Cl.
CPC ......... G09G 3/3406 (2013.01); G06Q 10/109 (2013.01); G09G 5/02 (2013.01)

(58) Field of Classification Search
CPC .......... G09G 3/3406; G09G 5/02; G09G 5/10; G06Q 10/109; G06Q 10/10; G06F 3/1423; G06F 3/04817
See application file for complete search history.

(56) References Cited

U.S. PATENT DOCUMENTS 7,124,164 B1 *  10/2006  Chemtob ............ H04L 12/1822
                                                     709/204
2014/0211933 A1 *  7/2014  Vymenets ........... H04M 3/5175
                                                     379/265.06

FOREIGN PATENT DOCUMENTS

JP    2001-101304         4/2001
JP    2001101304 A   *    4/2001

OTHER PUBLICATIONS

International Search Report issued in International Pat. Appl. No. PCT/JP2022/004626, dated Mar. 15, 2022, along with an English language translation thereof.

* cited by examiner

*Primary Examiner* — Brent D Castiaux
(74) *Attorney, Agent, or Firm* — Greenblum & Bernstein, P.L.C.

(57) ABSTRACT

A server is configured to: determine a ratio of each of a first group and a second group to be allocated to the multiple display objects according to a third user situation of a presentation target user or a schedule information; determine a display mode of each of multiple first display objects allocated to the first group in accordance with the determined ratio based on multiple first user situations, and determine a display mode of each of multiple second display objects allocated to the second group in accordance with the (Continued)

determined ratio based on multiple second user situations; and output setting information for displaying the multiple first display objects and the multiple second display objects in the determined display mode.

14 Claims, 12 Drawing Sheets

FIG.3

| TIME PERIOD | GROUP RATIO |
|---|---|
| FIRST TIME PERIOD FROM SCHEDULED WORK START TIME TO PREDETERMINED TIME BEFORE SCHEDULED WORK END TIME (8:00 TO 16:00) | FIRST GROUP 100% |
| SECOND TIME PERIOD FROM PREDETERMINED TIME BEFORE SCHEDULED WORK END TIME TO SCHEDULED WORK END TIME (16:00 TO 18:00) | FIRST GROUP 50% AND SECOND GROUP 50% |
| THIRD TIME PERIOD FROM SCHEDULED WORK END TIME TO PREDETERMINED TIME AFTER SCHEDULED WORK END TIME (18:00 TO 23:00) | SECOND GROUP 100% |
| ... | ... |

FIG.10

| RATIO CONDITIONS | GROUP RATIO |
|---|---|
| FIRST RATIO CONDITIONS | FIRST GROUP 100% |
| SECOND RATIO CONDITIONS | FIRST GROUP 50% AND SECOND GROUP 50% |
| THIRD RATIO CONDITIONS | SECOND GROUP 100% |
| ... | ... |

INFORMATION PROCESSING METHOD, INFORMATION PROCESSING DEVICE, AND NON-TRANSITORY COMPUTER READABLE RECORDING MEDIUM STORING INFORMATION PROCESSING PROGRAM

FIELD OF INVENTION

The present disclosure relates to a technique of presenting a situation of another user to a presentation target user.

BACKGROUND ART

For example, Patent Literature 1 discloses an information processing method including the steps of: reading out related information including a situation of each member; performing output control representing the situation of each member on an icon representing corresponding one of multiple members based on the read-out information; and disposing and outputting icons to enable the icons to be visually identified for each group.

Unfortunately, the conventional technique described above allows the members of each group to be individually identified, and displays the members to be able to be individually identified. Thus, the conventional technique described above cannot present the situation of each member without individually identifying each member, and is required to be further improved.

Patent Literature 1: JP 2001-101304 A

SUMMARY OF THE INVENTION

The present disclosure is made to solve the above problems, and an object of the present disclosure is to provide a technique capable of presenting situations of other users to a presentation target user without individually identifying the other users.

An information processing method according to the present disclosure includes, by a computer: acquiring a first user situation indicating a situation of each of multiple users belonging to a first group and a second user situation indicating a situation of each of multiple users belonging to a second group different from the first group; acquiring a third user situation indicating a situation of a presentation target user who presents a situation of another user using a display device including multiple display objects or schedule information on the presentation target user; determining a ratio of each of the first group and the second group to be allocated to the multiple display objects according to the acquired third user situation or the schedule information; determining a display mode of each of multiple first display objects allocated to the first group in accordance with the determined ratio based on the acquired multiple first user situations, and determining a display mode of each of multiple second display objects allocated to the second group in accordance with the determined ratio based on the acquired multiple second user situations; and outputting setting information for displaying the multiple first display objects and the multiple second display objects in the determined display mode.

The present disclosure enables presenting situations of other users to a presentation target user without individually identifying the other users.

BRIEF DESCRIPTION OF THE DRAWINGS

FIG. 3 is a diagram illustrating an example of a ratio determination rule stored in a ratio determination rule storage unit according to the first embodiment.

FIG. 10 is a diagram illustrating an example of a ratio determination rule stored in a ratio determination rule storage unit according to the second embodiment.

Figure 1:
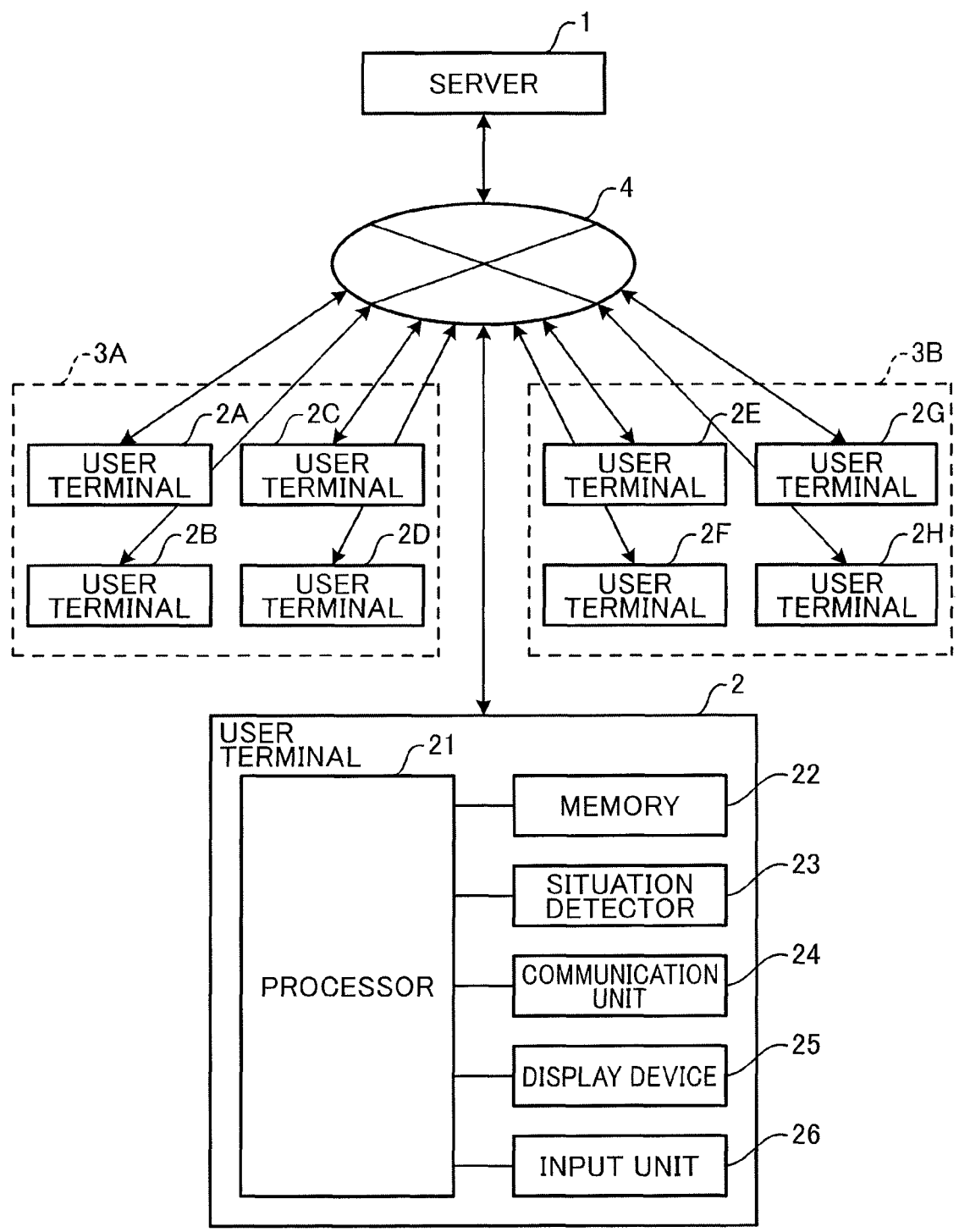
FIG. 1 is a diagram illustrating an example of a configuration of an information presentation system according to a first embodiment of the present disclosure.

DETAILED DESCRIPTION (Underlying Knowledge of Present Disclosure)

The conventional technique described above causes a personal view screen to display an icon indicating a member for each of multiple groups, a type of data shared by each group, and a status of each member such as out of the house, in a meeting, or eating.

Thus, the conventional technique described above presents the situation of each member while allowing the members of each group to be individually identified, and displaying the members to be able to be individually identified. Therefore, the conventional technique described above is less likely to present a situation of another user to a presentation target user while protecting privacy of the other user.

To solve the problems above, an information processing method according to an aspect of the present disclosure includes, by a computer: acquiring a first user situation indicating a situation of each of multiple users belonging to a first group and a second user situation indicating a situation of each of multiple users belonging to a second group different from the first group; acquiring a third user situation indicating a situation of a presentation target user who presents a situation of another user using a display device including multiple display objects or schedule information on the presentation target user; determining a ratio of each of the first group and the second group to be allocated to the multiple display objects according to the acquired third user situation or the schedule information; determining a display mode of each of multiple first display objects allocated to the first group in accordance with the determined ratio based on the acquired multiple first user situations, and determining a display mode of each of multiple second display objects allocated to the second group in accordance with the determined ratio based on the acquired multiple second user situations; and outputting setting information for displaying the multiple first display objects and the multiple second display objects in the determined display mode.

According to this configuration, the ratio of the first group and the second group to be allocated to the multiple display objects is determined according to the third user situation indicating the situation of the presentation target user or the schedule information on the presentation target user; the display mode of each of the multiple first display objects allocated to the first group in accordance with the determined ratio is determined based on the multiple first user situations of the respective multiple users belonging to the first group; the display mode of each of the multiple second display objects allocated to the second group in accordance with the determined ratio is determined based on the multiple second user situations of the respective multiple users belonging to the second group; and the multiple first display objects and the multiple second display objects are displayed in the determined display mode.

Thus, the presentation target user can know the situations of the respective multiple users belonging to the first group and the situations of the respective multiple users belonging to the second group by checking the display modes of the displayed multiple first display objects and second display objects, so that the situations of other users can be presented to the presentation target user without individually identifying the other users.

The information processing method described above may further include: determining the multiple users belonging to the first group based on an attribute related to work of the presentation target user, and determining the multiple users belonging to the second group based on a predetermined action of the presentation target user performed outside work hours.

With this configuration, a situation of another user related to the work of the presentation target user and a situation of another user related to the predetermined action of the presentation target user performed outside the work hours can be presented.

The information processing method described above may be configured such that the first user situation indicates whether each of the multiple users belonging to the first group is at work, and the second user situation indicates whether each of the multiple users belonging to the second group performs a predetermined action to be performed outside work hours.

With this configuration, the presentation target user can check whether another user is at work with a display mode of the multiple first display objects, and can check whether another user performs the predetermined action outside work hours with a display mode of the multiple second display objects.

The information processing method described above may be configured such that in the determining the ratio, a first time period, a second time period after the first time period, and a third time period after the second time period are determined according to the schedule information, a ratio of the first group is set to be larger than a ratio of the second group when a current time is in the first time period, the ratio of the first group and the ratio of the second group are each set to be 50% when the current time is in the second time period, and the ratio of the second group is set to be larger than the ratio of the first group when the current time is in the third time period.

With this configuration, multiple first display objects are displayed according to the first user situations of the respective multiple users belonging to the first group when the current time is in the first time period. When the current time is in the second time period, the multiple first display objects and the multiple second display objects are displayed according to the first user situations of the respective multiple users belonging to the first group and the second user situations of the respective multiple users belonging to the second group. When the current time is in the third time period, the multiple second display objects are displayed according to the second user situations of the respective multiple users belonging to the second group.

Thus, the user situation to be reflected in the multiple display objects can be changed according to a schedule of the presentation target user, and a situation of another user can be presented according to the schedule of the presentation target user.

The information processing method described above may be configured such that, in the determining the ratio, the ratio of the first group is set to be larger than the ratio of the second group when the third user situation indicates a situation at work, and the number of users indicated to be at work by the multiple first user situations acquired is larger than the number of users at a first ratio of all users belonging to the first group, the ratio of the first group and the ratio of the second group are each set to be 50% when the third user situation indicates a situation at work, and the number of users indicated to be at work by the multiple first user situations acquired is larger than the number of users at a second ratio of all the users belonging to the first group and is equal to or smaller than the number of users at the first ratio of all the users belonging to the first group, and the ratio of the second group is set to be larger than the ratio of the first group when the third user situation indicates a situation at work, and the number of users indicated to be at work by the multiple first user situations acquired is equal to or smaller than the number of users at the second ratio of all the users belonging to the first group.

With this configuration, the multiple first display objects are displayed according to the first user situations of the respective multiple users belonging to the first group when the third user situation indicates a situation at work, and the number of users indicated to be at work by the multiple first user situations acquired is larger than the number of users at the first ratio of all the users belonging to the first group. When the third user situation indicates a situation at work, and the number of users indicated to be at work by the multiple first user situations acquired is larger than the number of users at the second ratio of all the users belonging to the first group and is equal to or smaller than the number of users at the first ratio, the multiple first display objects and the multiple second display objects are displayed according to the first user situations of the respective multiple users belonging to the first group and the second user situations of the respective multiple users belonging to the second group. When the third user situation indicates a situation at work, and the number of users indicated to be at work by the multiple first user situations acquired is equal to or smaller than the number of users at the second ratio of all the users belonging to the first group, the multiple second display objects is displayed according to the second user situations of the respective multiple users belonging to the second group.

Thus, the user situation to be reflected in the multiple display objects can be changed according to a situation of the presentation target user, and a situation of another user can be presented according to the situation of the presentation target user.

The information processing method described above may be configured such that luminance of each of the multiple display objects is adjustable, and in the determining the display mode, the multiple first display objects include the first display object that is to be displayed with luminance of a predetermined value or more and that is determined based on the multiple first user situations acquired, and the multiple second display objects include the second display object that is to be displayed with luminance of a predetermined value or more and that is determined based on the multiple second user situations acquired.

With this configuration, the presentation target user can know a situation of another user by checking the first display object displayed with the luminance equal to or more than the predetermined value based on the multiple first user situations or the second display object displayed with the luminance equal to or more than the predetermined value based on the multiple second user situations.

The information processing method described above may be configured such that the multiple display objects include respective multiple light emitting diodes that are individually controllable for lighting.

With this configuration, the presentation target user can know a situation of another user by checking a first light emitting diode turned on with the luminance of the predetermined value or more based on the multiple first user situations or a second light emitting diode turned on with the luminance of the predetermined value or more based on the multiple second user situations.

The information processing method described above may be configured such that the multiple display objects include respective multiple object images that are displayed on a screen.

With this configuration, the presentation target user can know a situation of another user by checking a first object image displayed with the luminance equal to or more than the predetermined value based on the multiple first user situations or a second object image displayed with the luminance equal to or more than the predetermined value based on the multiple second user situations.

The information processing method described above may be configured such that the display mode of one of the multiple first display objects is determined based on the first user situations of two or more of the multiple users belonging to the first group, and the display mode of one of the multiple second display objects is determined based on the second user situations of two or more of the multiple users belonging to the second group.

With this configuration, since the display mode of the one first display object is determined based on the first user situations of the two or more users, and the display mode of the one second display object is determined based on the second user situations of the two or more users, one user of the multiple users is less likely to be identified, the one user corresponding to the one first display object or the one second display object.

The information processing method described above may be configured such that the display mode of two or more of the multiple first display objects is determined based on the first user situation of one user of the multiple users belonging to the first group, and the display mode of two or more of the multiple second display objects is determined based on the second user situation of one user of the multiple users belonging to the second group.

With this configuration, since the display mode of the two or more first display objects is determined based on the first user situation of one user, and the display mode of the two or more second display objects is determined based on the second user situations of the one user, one user of the multiple users to be less likely to be identified, the one user corresponding to the two or more first display objects or the two or more second display objects.

The information processing method described above may be configured such that, in the determining the display mode, a color of the first display object is made different from a color of the second display object.

With this configuration, the presentation target user can identify the first display object and the second display object from among the multiple display objects displayed because the color of the first display object is different from the color of the second display object.

The present disclosure can be implemented not only as the information processing method that performs characteristic processing as described above, but also as an information processing device or the like having a characteristic configuration corresponding to a characteristic method performed according to the information processing method. The present disclosure can also be implemented as a computer program that causes a computer to execute characteristic processing included in the information processing method described above. Thus, even other aspects below can achieve an effect as in the above information processing method.

An information processing device according to another aspect of the present disclosure includes: a first acquisition unit configured to acquire a first user situation indicating a situation of each of multiple users belonging to a first group and a second user situation indicating a situation of each of multiple users belonging to a second group different from the first group; a second acquisition unit configured to acquire a third user situation indicating a situation of a presentation target user who presents a situation of another user using a display device including multiple display objects or schedule information on the presentation target user; a first determination unit configured to determine a ratio of each of the first group and the second group to be allocated to the multiple display objects according to the acquired third user situation or the schedule information; a second determination unit configured to determine a display mode of each of multiple first display objects allocated to the first group in accordance with the determined ratio based on the acquired multiple first user situations, and determine a display mode of each of multiple second display objects allocated to the second group in accordance with the determined ratio based on the acquired multiple second user situations; and an output unit configured to output setting information for displaying the multiple first display objects and the multiple second display objects in the determined display mode.

A non-transitory computer readable recording medium storing an information processing program according to yet another aspect of the present disclosure causes a computer to execute functions of: acquiring a first user situation indicating a situation of each of multiple users belonging to a first group and a second user situation indicating a situation of each of multiple users belonging to a second group different from the first group; acquiring a third user situation indicating a situation of a presentation target user who presents a situation of another user using a display device including multiple display objects or schedule information on the presentation target user; determining a ratio of each of the first group and the second group to be allocated to the multiple display objects according to the acquired third user situation or the schedule information; determining a display mode of each of multiple first display objects allocated to the first group in accordance with the determined ratio based on the acquired multiple first user situations, and determining a display mode of each of multiple second display objects allocated to the second group in accordance with the determined ratio based on the acquired multiple second user situations; and outputting setting information for displaying the multiple first display objects and the multiple second display objects in the determined display mode.

An information processing method according to yet another aspect of the present disclosure includes, by a computer: acquiring a first selection condition for selecting multiple users belonging to a first group and a second selection condition for selecting multiple users belonging to a second group different from the first group; acquiring a situation of a presentation target user to whom a situation of another user is presented by a display device including multiple display objects or schedule information on the presentation target user; and outputting a ratio of each of the first group and the second group to be allocated to the multiple display objects according to the situation of the presentation target user or the schedule information, a display mode of each of multiple first display objects allocated to the first group based on situations of the multiple users belonging to the first group, and a display mode of each of multiple second display objects allocated to the second group based on situations of the multiple users belonging to the second group.

With this configuration, the ratio of each of the first group and the second group to be allocated to the multiple display objects according to the situation of the presentation target user or the schedule information on the presentation target user, the display mode of each of the multiple first display objects allocated to the first group based on the situations of the multiple users belonging to the first group, and the display mode of each of the multiple second display objects allocated to the second group based on the situations of the multiple users belonging to the second group are output.

Thus, the presentation target user can know the situations of the respective multiple users belonging to the first group and the situations of the respective multiple users belonging to the second group by checking the display modes of the outputted multiple first display objects and second display objects, so that the situations of other users can be presented to the presentation target user without individually identifying the other users.

Embodiments of the present disclosure will be described below with reference to the accompanying drawings. The embodiments below are each an example in which the present disclosure is embodied, and is not intended to limit the technical scope of the present disclosure.

First Embodiment

FIG. 1 is a diagram illustrating an example of a configuration of an information presentation system according to a first embodiment of the present disclosure. The information presentation system illustrated in FIG. 1 includes a server 1 and user terminals 2, and 2A to 2H.

The server 1 is a cloud server, for example, and is communicably connected to the user terminals 2, and 2A to 2H via a network 4. The network 4 is the Internet, for example. The server 1 has a configuration that will be described later with reference to FIG. 2.

The user terminal 2 is a personal computer, for example. The user terminal 2 is used by a presentation target user to whom a situation of another user is presented by a display device 25. The user terminals 2A to 2H are used by other users different from the presentation target user.

The user terminal 2 includes a processor 21, a memory 22, a situation detector 23, a communication unit 24, a display device 25, and an input unit 26. The user terminals 2A to 2H are each identical in configuration to the user terminal 2.

The processor 21 is a central processing unit (CPU), for example. The processor 21 controls the entire user terminal 2.

The memory 22 is a storage device capable of storing various types of information, such as a random access memory (RAM), a hard disk drive (HDD), a solid state drive (SSD), or a flash memory. The memory 22 stores various types of information.

The situation detector 23 detects a situation of a user. The situation detector 23 detects whether the user is at work, and detects whether the user performs a predetermined action performed outside work hours. The user uses the user terminal 2 at work. Thus, the situation detector 23 detects that the user is at work when power of the user terminal 2 is turned on, and detects that the user is not at work when the power of the user terminal 2 is turned off.

The situation detector 23 may receive an input of starting work from the user and an input of ending the work from the user.

Examples of the predetermined action performed outside work hours include an action related to a hobby such as running or a game, an action related to housework such as cleaning, washing, or cooking, and an action related to sleep. The situation detector 23 may receive an input of starting running from the user, and receive an input of ending the running from the user, using a smartphone, a smart watch, or the like. The situation detector 23 also detects that the user plays a game when power of a game machine is turned on, and detects that the user does not play a game when the power of the game machine is turned off.

The situation detector 23 may also acquire a captured image obtained by capturing an image of the user from a camera. Then, the situation detector 23 may detect whether the user performs a predetermined action to be performed outside work hours from the captured image by using image recognition processing. For example, the situation detector 23 may detect whether the user cooks from a captured image obtained by capturing a state in which the user is cooking by using the image recognition processing.

The situation detector 23 may also acquire an operation signal operated by the user for a home appliance from the home appliance. Then, the situation detector 23 may also detect whether the user performs a predetermined action to be performed outside work hours based on the operation signal. For example, the situation detector 23 may detect whether the user performs washing by acquiring an operation signal from a washing machine.

The situation detector 23 may acquire vital data such as a pulse and detect whether the user sleeps from the acquired vital data.

The communication unit 24 transmits a user situation indicating a situation of the user detected by the situation detector 23 to the server 1. The communication unit 24 transmits a first user situation indicating whether the user belonging to the first group is at work, or a second user situation indicating whether the user belonging to the second group performs the predetermined action to be performed outside work hours, to the server 1.

The display device 25 is a liquid crystal display device, for example. The display device 25 includes multiple display objects. The multiple display objects include multiple object images displayed on a screen. Although the user terminal 2 according to the first embodiment includes the display device 25, the present disclosure is not particularly limited thereto, and the display device 25 may be provided outside the user terminal 2.

The input unit 26 is a keyboard and a mouse, for example, and receives information input by the user. The input unit 26 receives an input of schedule information from the presentation target user. The schedule information indicates a schedule of a user, and includes at least a scheduled work start time and a scheduled work end time, for example. The communication unit 24 transmits the schedule information input with the input unit 26 to the server 1.

The communication unit 24 receives setting information for displaying multiple display objects in the display mode determined by the server 1 from the server 1. The processor 21 controls a display mode of multiple object images to be displayed on the display device 25 according to the setting information received by the communication unit 24.

Figure 2:
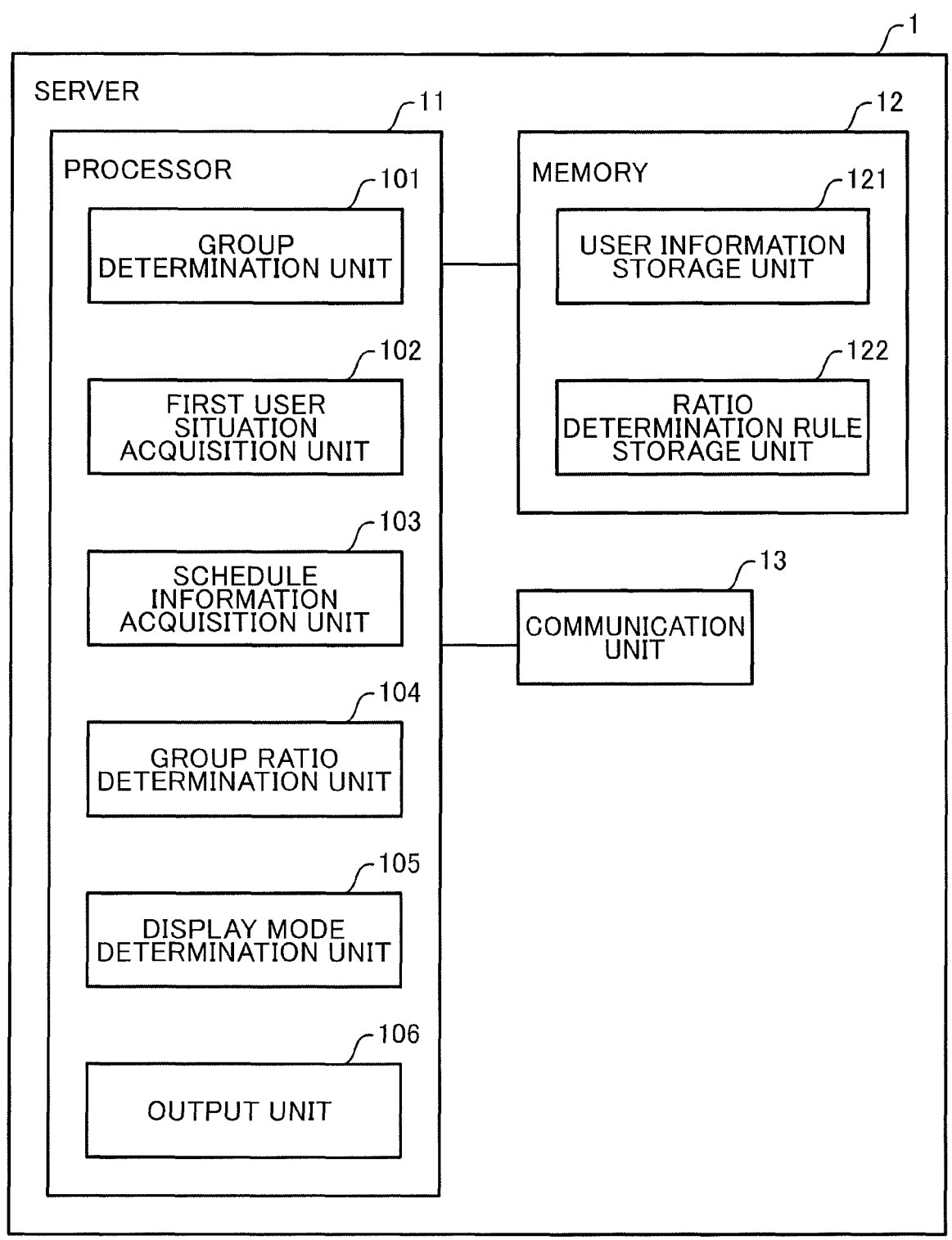
FIG. 2 is a diagram illustrating an example of a configuration of a server according to the first embodiment of the present disclosure.

FIG. 2 is a diagram illustrating an example of a configuration of the server 1 according to the first embodiment of the present disclosure.

The server 1 illustrated in FIG. 2 includes a processor 11, a memory 12, and a communication unit 13.

The processor 11 is a CPU, for example. The processor 11 implements a group determination unit 101, a first user situation acquisition unit 102, a schedule information acquisition unit 103, a group ratio determination unit 104, a display mode determination unit 105, and an output unit 106.

The memory 12 is a storage device capable of storing various types of information, such as a RAM, an HDD, an SSD, or a flash memory. The memory 12 implements a user information storage unit 121 and a ratio determination rule storage unit 122.

The user information storage unit 121 stores user information on multiple users. The user information includes information for identifying a user terminal used by each of the multiple users, attribute information on each of the multiple users, and schedule information on each of the multiple users. The attribute information indicates an attribute related to work of a user. The attribute information includes at least one of a name of a company in which the user works, a department to which the user belongs in the company, a position of the user, a job type of the user, a period of work hours of the user, and a regular holiday of the company, for example. The attribute information may represent an attribute regarding hobbies of the user, such as running and a game. The user information may include at least one of age and gender of each of the multiple users. The user information is input by each of the multiple users via a user terminal.

The communication unit 13 receives the schedule information transmitted by the user terminal 2, and stores the received schedule information in the user information storage unit 121.

The group determination unit 101 determines multiple users belonging to the first group based on the attribute related to the work of the presentation target user to whom a situation of another user is presented by the display device 25 including the multiple display objects, and determines multiple users belonging to the second group based on the predetermined action to be performed outside work hours of the presentation target user. The presentation target user is a user who uses the user terminal 2.

For example, the group determination unit 101 determines multiple users randomly selected from other users belonging to the same company and the same department as the presentation target user as the multiple users belonging to the first group with reference to the user information on the presentation target user stored in the user information storage unit 121. For example, the group determination unit 101 may determine multiple users randomly selected from other users having the same job type and the same position as the presentation target user as the multiple users belonging to the first group with reference to the user information on the presentation target user stored in the user information storage unit 121.

For example, the group determination unit 101 may determine multiple users having the same work hours up to the current time as the presentation target user as the multiple users belonging to the first group. That is, the group determination unit 101 may determine a user having work hours less than three hours, a user having work hours of three hours or more and less than seven hours, or a user having work hours of seven hours or more, as the multiple users belonging to the first group.

The multiple users belonging to the first group is determined according to a rule that may be determined in advance by the presentation target user. For example, the group determination unit 101 may receive an attribute to be used when determining members belonging to the first group, the attribute being set by the presentation target user.

The group determination unit 101 may receive a first selection condition for selecting multiple users belonging to the first group and a second selection condition for selecting multiple users belonging to a second group different from the first group, the first and second selection conditions being set by the presentation target user.

Specifically, the user terminal 2 may display a selection condition reception screen on the display device 25, for example, the selection condition reception screen being configured to receive the first selection condition for selecting the multiple users belonging to the first group and the second selection condition for selecting the multiple users belonging to the second group, the first and second selection conditions being input by the presentation target user. For example, the selection condition reception screen may display sentences such as "which user is to be set to first group?" and "which user is to be set to second group?", and may display the first selection condition and the second selection condition such as "same company" and "same department" in a selectable manner. The selection condition reception screen may also display a sentence such as "please determine attribute of user to be displayed", and may display the first selection condition and the second selection condition such as the "same company" and the "same department" in a selectable manner.

The input unit 26 of the user terminal 2 may receive the first selection condition for selecting the multiple users belonging to the first group and the second selection condition for selecting the multiple users belonging to the second group, the first and second selection conditions being input by the presentation target user. For example, the presentation target user selects the first selection condition for selecting the multiple users belonging to the first group and the second selection condition for selecting the multiple users belonging to the second group on the selection condition reception screen.

Then, the communication unit 24 of the user terminal 2 may transmit the first selection condition for selecting the multiple users belonging to the first group and the second selection condition for selecting the multiple users belonging to the second group to the server 1, the first and second selection conditions being input by the presentation target user. The communication unit 13 of the server 1 may acquire the first selection condition for selecting the multiple users belonging to the first group and the second selection condition for selecting the multiple users belonging to the second group. The group determination unit 101 may select the multiple users belonging to the first group based on the first selection condition and select the multiple users belonging to the second group based on the second selection condition.

For example, the group determination unit 101 determines multiple users randomly selected from other users having the same hobby as the presentation target user as the multiple users belonging to the second group with reference to the user information stored in the user information storage unit 121. The group determination unit 101 may also determine multiple users randomly selected from other users who have a hobby of running, for example, as the multiple users belonging to the second group. The group determination unit 101 may also determine multiple users randomly selected from other users who do the same housework as the presentation target user, for example, as the multiple users belonging to the second group.

The multiple users belonging to the first group and the second group may be determined in advance.

The user terminals 2A to 2D illustrated in FIG. 1 are used by corresponding multiple users belonging to the first group 3A, and the user terminals 2E to 2H are used by corresponding multiple users belonging to the second group 3B.

The first user situation acquisition unit 102 acquires the first user situation indicating a situation of each of the multiple users belonging to the first group and the second user situation indicating a situation of each of the multiple users belonging to the second group different from the first group. The first user situation indicates whether each of the multiple users belonging to the first group is at work. The second user situation indicates whether each of the multiple users belonging to the second group performs the predetermined action to be performed outside work hours.

Here, the communication unit 13 receives the first user situation from each of the user terminals 2A to 2D of the corresponding multiple users belonging to the first group determined by the group determination unit 101, and receives the second user situation from each of the user terminals 2E to 2H of the corresponding multiple users belonging to the second group determined by the group determination unit 101. The first user situation acquisition unit 102 acquires the first user situation and the second user situation from the communication unit 13.

Although the communication unit 13 receives the first user situation and the second user situation from the user terminals 2A to 2H in the first embodiment, the present disclosure is not particularly limited thereto. The communication unit 13 may receive the first user situation and the second user situation from another device that collects the first user situation and the second user situation from each of the user terminals 2A to 2H. For example, when a management server manages information on attendance of a user, the communication unit 13 may receive the first user situation from the management server.

The first user situation acquisition unit 102 may acquire the first user situation indicating the situation of each of the multiple users belonging to the first group selected based on the first selection condition and the second user situation indicating the situation of each of the multiple users belonging to the second group selected based on the second selection condition.

The schedule information acquisition unit 103 acquires schedule information on a presentation target user to whom a situation of another user is presented by the display device 25. The schedule information acquisition unit 103 acquires the schedule information on the presentation target user from the user information storage unit 121.

The group ratio determination unit 104 determines a ratio of each of the first group and the second group to be allocated to multiple display objects according to the schedule information acquired by the schedule information acquisition unit 103.

The ratio determination rule storage unit 122 stores in advance a ratio determination rule in which multiple time periods determined according to the schedule information on the presentation target user is associated with the ratio of each of the first group and the second group to be allocated to the multiple display objects.

FIG. 3 is a diagram illustrating an example of the ratio determination rule stored in the ratio determination rule storage unit 122 according to the first embodiment.

As illustrated in FIG. 3, all (100%) of the multiple display objects are allocated to the first group in a first time period from the scheduled work start time to a predetermined time before the scheduled work end time. That is, the display modes of all of the multiple display objects is determined according to the first user situations of the respective multiple users belonging to the first group.

Then, 50% of the multiple display objects are allocated to the first group, and the remaining 50% of the multiple display objects are allocated to the second group, in a second time period from a predetermined time before the scheduled work end time to the scheduled work end time. That is, the display modes of half of the multiple display objects are determined according to the first user situations of the respective multiple users belonging to the first group, and the display modes of the remaining half of the multiple display objects are determined according to the second user situations of the respective multiple users belonging to the second group.

Then, all (100%) of the multiple display objects is allocated to the second group in a third time period from the scheduled work end time to a predetermined time after the scheduled work end time. That is, the display modes of all of the multiple display objects are determined according to the second user situations of the respective multiple users belonging to the second group.

The group ratio determination unit 104 determines the first time period, the second time period after the first time period, and the third time period after the second time period according to the schedule information. For example, when the scheduled work start time included in the schedule information is 8:00 and the scheduled work end time included in the schedule information is 18:00, the group ratio determination unit 104 determines a period from 8:00 to 16:00 as the first time period, the period being from the scheduled work start time to two hours before the scheduled work end time. In this case, the group ratio determination unit 104 determines a period from 16:00 to 18:00 as the second time period, the period being from two hours before the scheduled work end time to the scheduled work end time. In this case, the group ratio determination unit 104 then determines a period from 18:00 to 23:00 as the third time period, the period being from the scheduled work end time to five hours after the scheduled work end time.

When the current time is in the first time period, the group ratio determination unit 104 increases the ratio of the first group to larger than the ratio of the second group. Specifically, when the current time is in the first time period, the group ratio determination unit 104 sets the ratio of the first group to 100% and the ratio of the second group to 0% with reference to the ratio determination rule stored in the ratio determination rule storage unit 122.

When the current time is in the second time period, the group ratio determination unit 104 sets the ratio of each the first group and the second group to 50% with reference to the ratio determination rule stored in the ratio determination rule storage unit 122.

When the current time is in the third time period, the group ratio determination unit 104 increases the ratio of the second group to larger than the ratio of the first group. Specifically, when the current time is in the third time period, the group ratio determination unit 104 sets the ratio of the second group to 100% and the ratio of the first group to 0% with reference to the ratio determination rule stored in the ratio determination rule storage unit 122.

Although the group ratio determination unit 104 sets the ratio of the first group to 100% when the current time is in the first time period in the first embodiment, the present disclosure is not particularly limited thereto, and the ratio of the first group may only be set larger than the ratio of the second group. For example, when the current time is in the first time period, the group ratio determination unit 104 may set the ratio of the first group to 90% and the ratio of the second group to 10%.

Although the group ratio determination unit 104 sets the ratio of the second group to 100% when the current time is in the third time period, the present disclosure is not particularly limited thereto, and the ratio of the second group may only be set larger than the ratio of the first group. For example, when the current time is in the third time period, the group ratio determination unit 104 may set the ratio of the second group to 90% and the ratio of the first group to 10%.

The display mode determination unit 105 determines a display mode of each of the multiple first display objects allocated to the first group according to the ratio determined by the group ratio determination unit 104 based on the multiple first user situations acquired by the first user situation acquisition unit 102, and determines a display mode of each of the multiple second display objects allocated to the second group according to the ratio determined by the group ratio determination unit 104 based on the multiple second user situations acquired by the first user situation acquisition unit 102.

Luminance of each of the multiple display objects is adjustable. The display mode determination unit 105 determines a first display object to be displayed with luminance of a predetermined value or more from among the multiple first display objects based on the acquired multiple first user situations, and determines a second display object to be displayed with luminance of a predetermined value or more from among the multiple second display objects based on the acquired multiple second user situations.

For example, when the ratio of the first group is determined to be 100% by the group ratio determination unit 104, the display mode determination unit 105 determines a display object to be displayed with luminance of the predetermined value or more from among all of the multiple display objects (first display objects) in accordance with the number of first user situations, each indicating a situation at work, among the multiple first user situations. When the number of multiple display objects is the same as the number of multiple users belonging to the first group, the display mode determination unit 105 determines the number of display objects to be displayed with luminance of the predetermined value or more in accordance with the number of first user situations, each indicating a situation at work.

For example, when the ratio of the first group is determined to be 50% and the ratio of the second group is determined to be 50% by the group ratio determination unit 104, the display mode determination unit 105 determines a first display object to be displayed with luminance of the predetermined value or more from among the first display objects of half of all of display objects in accordance with the number of first user situations, each indicating a situation at work, among the multiple first user situations, and determines a second display object to be displayed with luminance of the predetermined value or more from among the second display objects of half of all of the display objects in accordance the number of second user situations, each indicating that a user performs the predetermined action to be performed outside work hours, among the multiple second user situations. At this time, the display mode determination unit 105 causes the color of the first display object and the color of the second display object to be different.

For example, when the ratio of the second group is determined to be 100% by the group ratio determination unit 104, the display mode determination unit 105 determines a display object to be displayed with luminance of the predetermined value or more from among all of the multiple display objects (second display objects) in accordance with the number of second user situations, each indicating that a user performs the predetermined action to be performed outside work hours, among the multiple second user situations. When the number of multiple display objects is the same as the number of multiple users belonging to the second group, the display mode determination unit 105 determines the number of display objects to be displayed with luminance of the predetermined value or more in accordance with the number of second user situations, each indicating that a user performs the predetermined action to be performed outside work hours.

When the number of multiple users belonging to the first group is larger than the number of multiple first display objects, the display mode of one of the multiple first display objects may be determined based on the first user situations of two or more of the multiple users belonging to the first group. Similarly, when the number of multiple users belonging to the second group is larger than the number of multiple second display objects, the display mode of one of the multiple second display objects may be determined based on the second user situations of two or more of the multiple users belonging to the second group.

When the display mode of one first display object or one second display object is determined based on the first user situations or the second user situations of the respective multiple users, the display mode determination unit 105 may change luminance of one first display object or one second display object in accordance with the number of first user situations, each indicating a situation at work or the number of second user situations, each indicating that a user performs the predetermined action to be performed outside work hours. For example, when the display mode of one first display object is determined based on the first user situations of four users, and four first user situations each indicate a situation at work, the display mode determination unit 105 may determine luminance of the corresponding first display object to be 100%. When three first user situations each indicate a situation at work, the display mode determination unit 105 may determine the luminance of the corresponding first display object to be 75%. When two first user situations each indicate a situation at work, the display mode determination unit 105 may determine the luminance of the corresponding first display object to be 50%. When one first user situation indicates a situation at work, the display mode determination unit 105 may determine the luminance of the corresponding first display object to be 25%.

As described above, when luminance of the first display object is changed in accordance with the number of users at work, the presentation target user can recognize the number of other users at work by checking the change in luminance of the first display object.

When the number of multiple users belonging to the first group is smaller than the number of multiple first display objects, the display mode of two or more of the multiple first display objects may be determined based on the first user situation of one user among the multiple users belonging to the first group. Similarly, when the number of multiple users belonging to the second group is smaller than the number of multiple second display objects, the display mode of two or more of the multiple second display objects may be determined based on the second user situation of one user among the multiple users belonging to the second group. In these cases, two or more first display objects may be displayed simultaneously, and two or more second display objects may be displayed simultaneously. The two or more first display objects may be displayed while being delayed from each other, and the two or more second display objects may be displayed while being delayed from each other.

When a small number of multiple users belongs to the first group, a change in a display mode of a display object may lead to identification of a user. Thus, the display mode determination unit 105 may gradually change the display mode of the display object until a predetermined time elapses from a time point when the number of first user situations, each indicating a situation at work, has decreased, instead of changing the display mode of the display object at the time point when the number of first user situations, each indicating a situation at work, has decreased.

The display mode determination unit 105 may also change the number of first user situations or the number of second user situations, which is to be associated with one first display object or one second display object, according to a type of the group. For example, the display mode determination unit 105 may associate multiple first user situations with one first display object, and one second user situation with one second display object. When a user who knows the presentation target user belongs to the first group or the second group, the display mode determination unit 105 may associate multiple first user situations with one first display object, or multiple second user situations with one second display object. In this case, the user information may include information indicating whether users know each other.

The output unit 106 outputs setting information for displaying the multiple first display objects and the multiple second display objects in the display mode determined by the display mode determination unit 105. The output unit 106 outputs the setting information to the user terminal 2 via the communication unit 13. The communication unit 13 transmits the setting information to the user terminal 2.

Although the first embodiment causes the processor 11 of the server 1 to implement the group determination unit 101, the first user situation acquisition unit 102, the schedule information acquisition unit 103, the group ratio determination unit 104, the display mode determination unit 105, and the output unit 106, and the memory 12 of the server 1 implements the user information storage unit 121 and the ratio determination rule storage unit 122, the present disclosure is not particularly limited thereto. The processor 21 of the user terminal 2 may implements the group determination unit 101, the first user situation acquisition unit 102, the schedule information acquisition unit 103, the group ratio determination unit 104, the display mode determination unit 105, and the output unit 106, and the memory 22 of the user terminal 2 may implement the user information storage unit 121 and the ratio determination rule storage unit 122.

The output unit 106 may also output the ratio of each of the first group and the second group to be allocated to the multiple display objects according to the situation of the presentation target user or the schedule information on the presentation target user, the display mode of each of the multiple first display objects allocated to the first group based on the situations of the multiple users belonging to the first group, and the display mode of each of the multiple second display objects allocated to the second group based on the situations of the multiple users belonging to the second group. That is, the output unit 106 may output the ratio of each of the first group and the second group, the display mode of each of the multiple first display objects, and the display mode of each of the multiple second display objects to the user terminal 2 via the communication unit 13.

The communication unit 24 of the user terminal 2 may receive the ratio of each of the first group and the second group, the display mode of each of the multiple first display objects, and the display mode of each of the multiple second display objects from the server 1. The processor 21 may control the display mode of multiple object images displayed on the display device 25 according to the ratio of each of the first group and the second group, the display mode of each of the multiple first display objects, and the display mode of each of the multiple second display objects, which are received by the communication unit 24.

Subsequently, information presentation processing with the server 1 according to the first embodiment of the present disclosure will be described.

Figure 4:
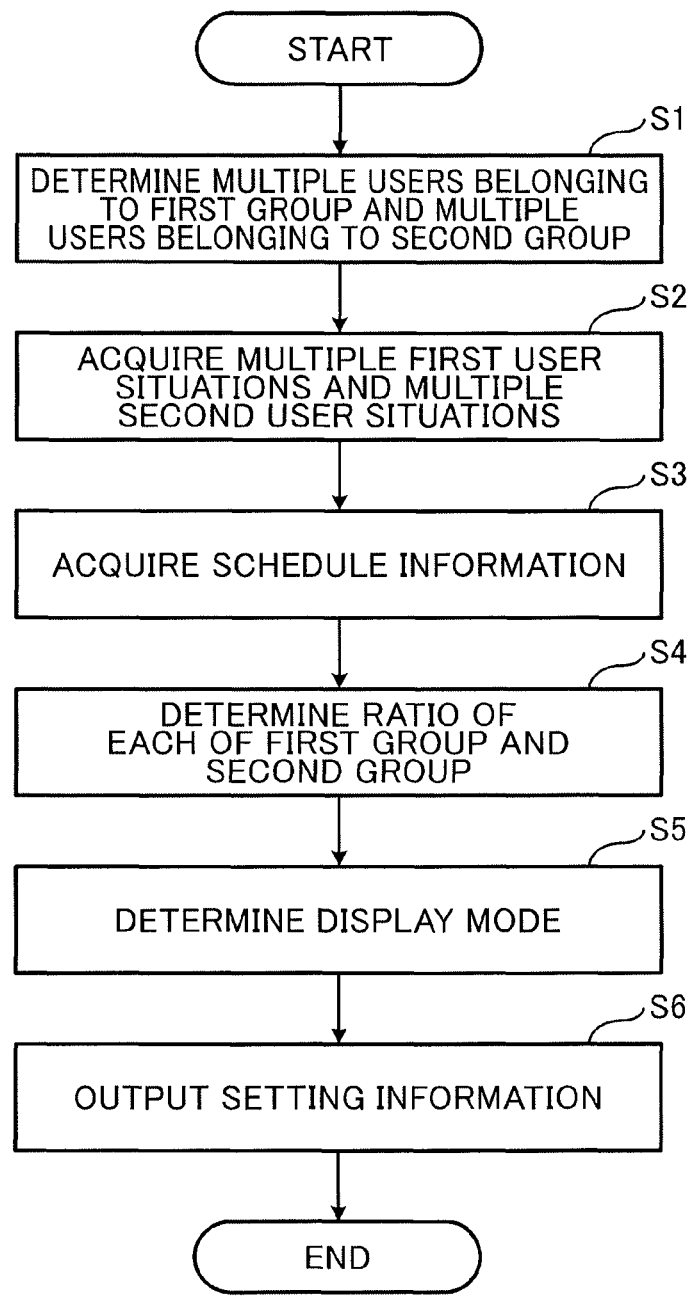
FIG. 4 is a flowchart for illustrating information presentation processing with the server according to the first embodiment of the present disclosure.

FIG. 4 is a flowchart for illustrating the information presentation processing with the server 1 according to the first embodiment of the present disclosure.

In step S1, the group determination unit 101 first determines multiple users belonging to the first group based on the attribute related to the work of the presentation target user, and determines multiple users belonging to the second group based on the predetermined action to be performed outside the work hours of the presentation target user, with reference to the user information on the presentation target user stored in the user information storage unit 121.

In subsequent step S2, the first user situation acquisition unit 102 acquires the first user situation indicating a situation of each of the multiple users belonging to the first group and the second user situation indicating a situation of each of the multiple users belonging to the second group different from the first group.

Although the first embodiment causes the first user situation acquisition unit 102 to acquire the first user situation indicating the situation of each of the multiple users belonging to the first group, and the second user situation indicating the situation of each of the multiple users belonging to the second group different from the first group, after the group determination unit 101 has determined the multiple users belonging to the first group, and determined the multiple users belonging to the second group, the present disclosure is not particularly limited thereto. After the first user situation acquisition unit 102 acquires the user situation indicating the situation of each of the multiple users, the group determination unit 101 may determine the multiple users belonging to the first group, and determine the multiple users belonging to the second group.

In subsequent step S3, the schedule information acquisition unit 103 acquires the schedule information on the presentation target user from the user information storage unit 121.

In subsequent step S4, the group ratio determination unit 104 determines a ratio of each of the first group and the second group to be allocated to multiple display objects according to the schedule information acquired by the schedule information acquisition unit 103.

In subsequent step S5, the display mode determination unit 105 determines a display mode of each of the multiple first display objects allocated to the first group according to the ratio determined by the group ratio determination unit 104 based on the multiple first user situations acquired by the first user situation acquisition unit 102, and determines a display mode of each of the multiple second display objects allocated to the second group according to the ratio determined by the group ratio determination unit 104 based on the multiple second user situations acquired by the first user situation acquisition unit 102.

In subsequent step S6, the output unit 106 outputs setting information for displaying the multiple first display objects and the multiple second display objects in the display mode determined by the display mode determination unit 105.

As described above, the ratio of the first group and the second group to be allocated to the multiple display objects is determined according to the schedule information on the presentation target user; the display mode of each of the multiple first display objects allocated to the first group in accordance with the determined ratio is determined based on the multiple first user situations of the respective multiple users belonging to the first group; the display mode of each of the multiple second display objects allocated to the second group in accordance with the determined ratio is determined based on the multiple second user situations of the respective multiple users belonging to the second group; and the multiple first display objects and the multiple second display objects are displayed in the determined display mode.

Thus, the presentation target user can know the situations of the respective multiple users belonging to the first group and the situations of the respective multiple users belonging to the second group by checking the display modes of the displayed multiple first display objects and second display objects, so that the situations of other users can be presented to the presentation target user without individually identifying the other users.

Figure 5:
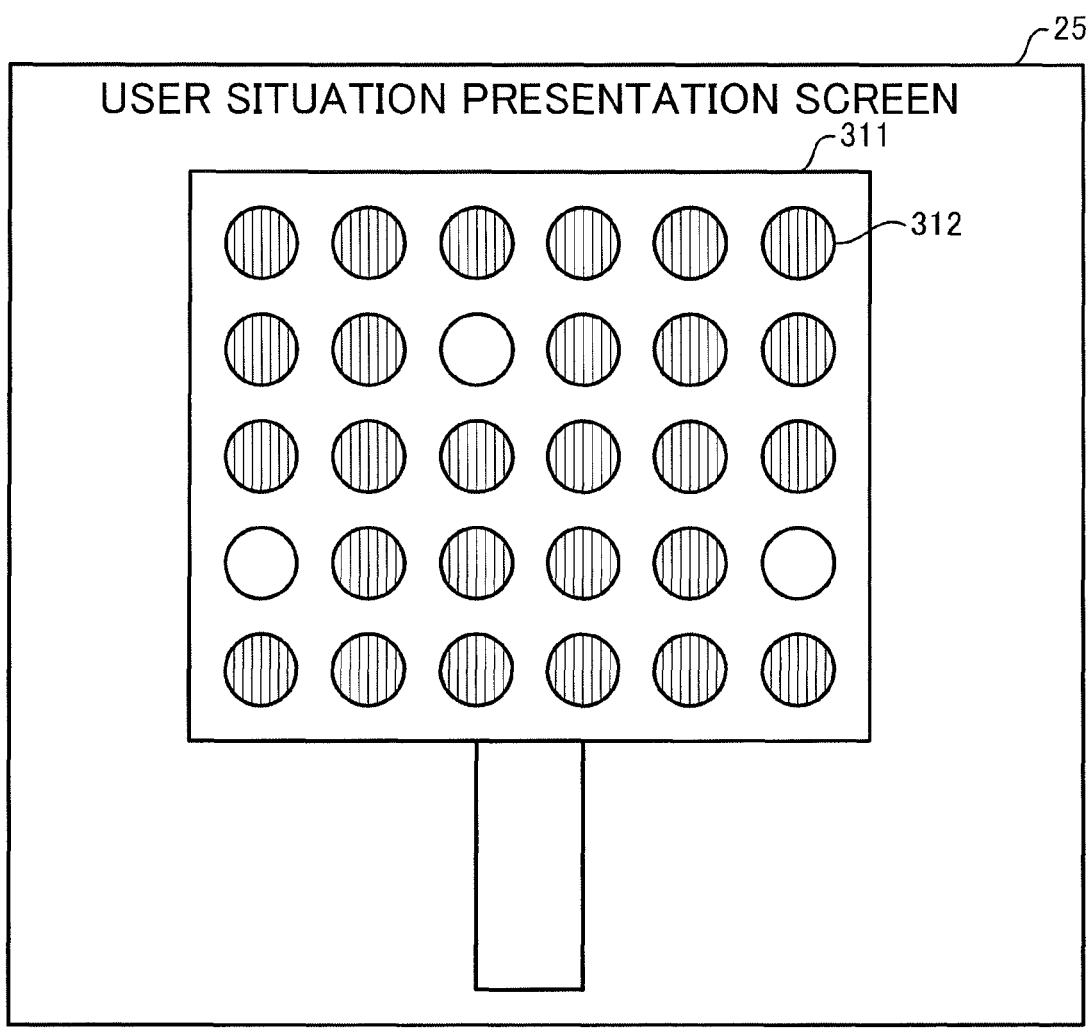
FIG. 5 is a diagram illustrating an example of multiple display objects displayed on a display device in a first time period in the first embodiment.
Figure 6:
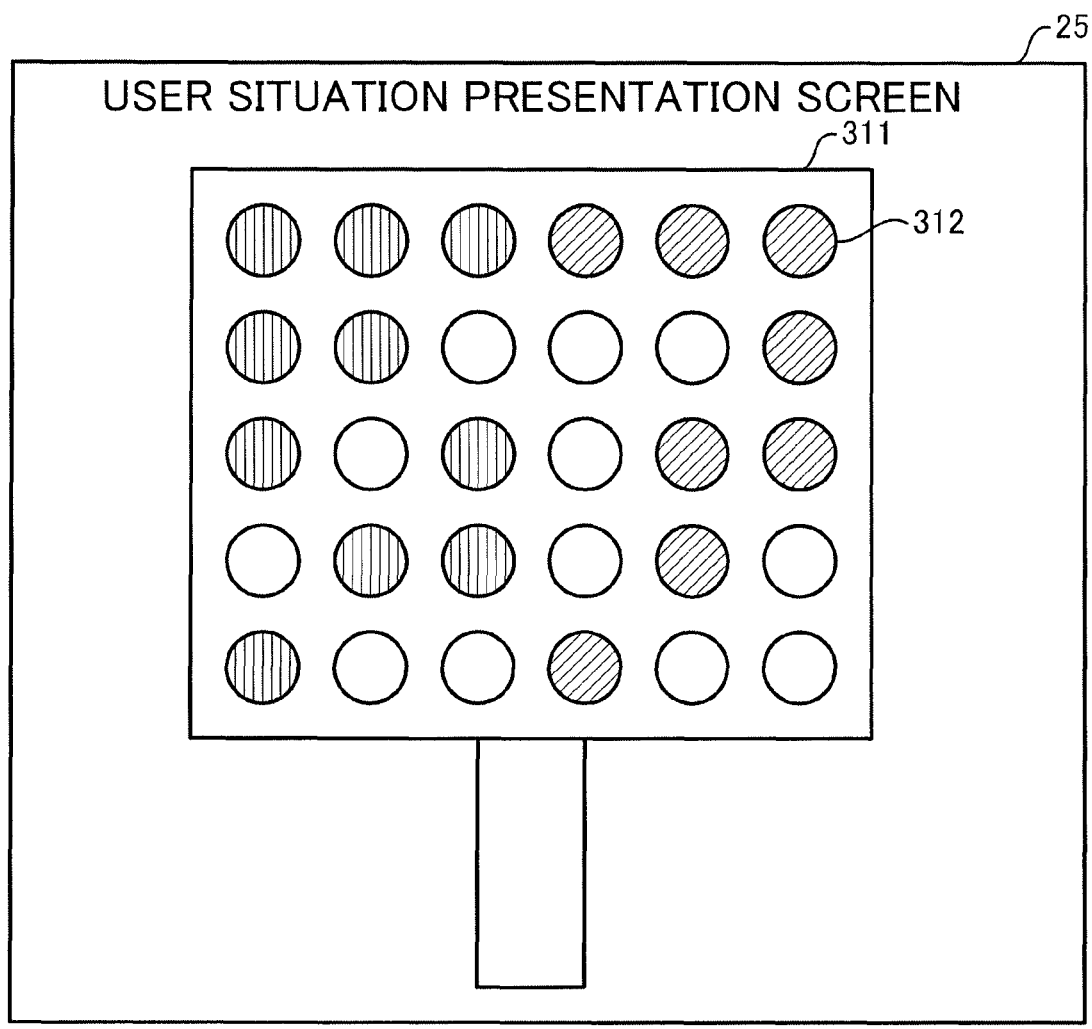
FIG. 6 is a diagram illustrating an example of multiple display objects displayed on a display device in a second time period in the first embodiment.
Figure 7:
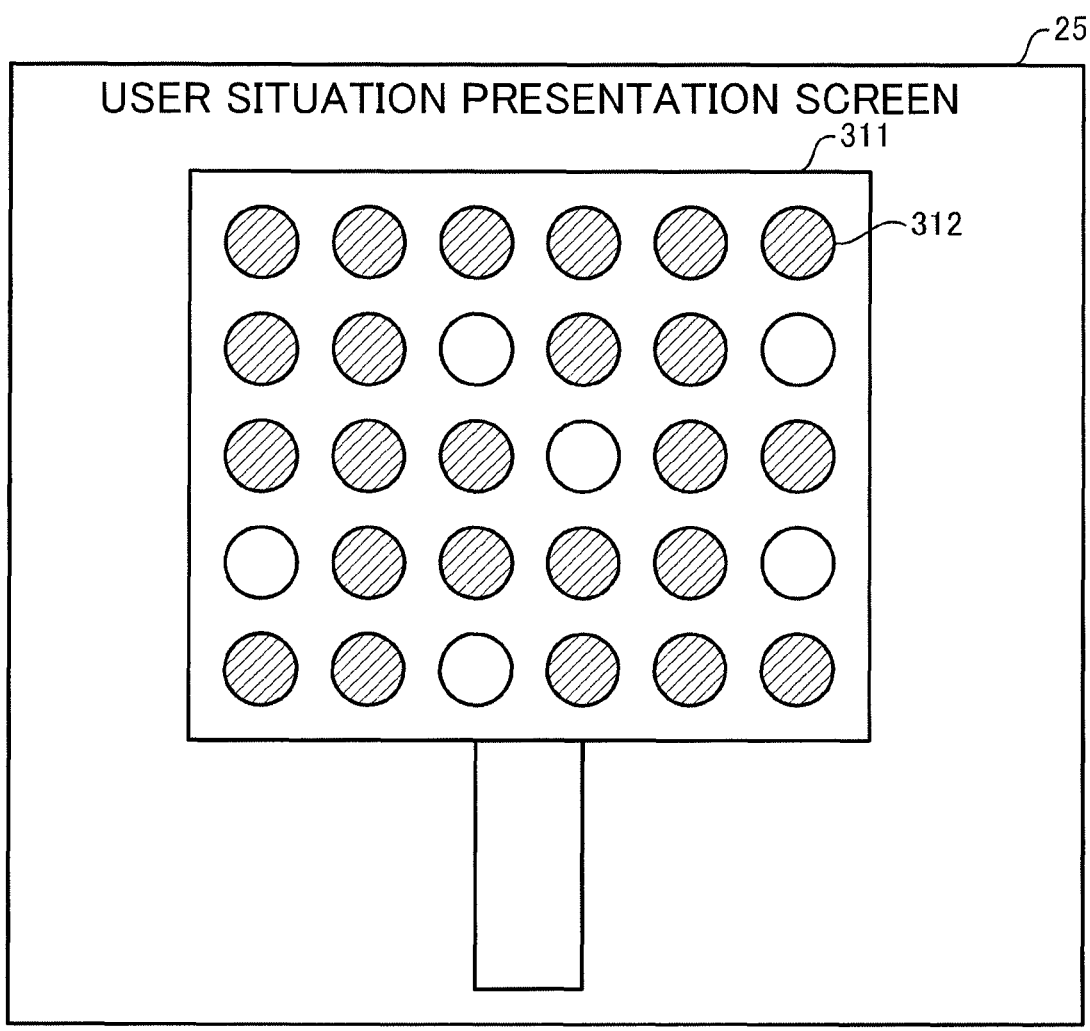
FIG. 7 is a diagram illustrating an example of multiple display objects displayed on a display device in a third time period in the first embodiment.

FIG. 5 is a diagram illustrating an example of multiple display objects displayed on the display device 25 in the first time period in the first embodiment, FIG. 6 is a diagram illustrating an example of multiple display objects displayed on the display device 25 in the second time period in the first embodiment, and FIG. 7 is a diagram illustrating an example of multiple display objects displayed on the display device 25 in the third time period in the first embodiment.

The display device 25 displays a user situation presentation screen for presenting a situation of another user to the presentation target user. The user situation presentation screen shows a tree object image 311 imitating a tree and multiple fruit object images 312, each imitating fruit. The example illustrated in each of FIGS. 5 to 7 shows thirty fruit object images 312. The multiple fruit object images 312 are examples of multiple display objects and represent situations of respective multiple users.

As illustrated in FIG. 5, a ratio of the first group to be allocated to the multiple fruit object images 312 is determined to be 100% in the first time period from 8:00 to 16:00, for example. Thus, a display mode of the multiple fruit object images 312 is determined based on the first user situations of the respective multiple users belonging to the first group. For example, when situations of the thirty users belonging to the first group are associated with the respective thirty fruit object images 312, the display mode determination unit 105 displays the fruit object images 312 in red in accordance with the number of first user situations indicating a situation at work. The fruit object image 312 corresponding to the user who is at work is displayed in red, and the fruit object image 312 corresponding to the user who is not at work is displayed in white. FIG. 5 shows twenty-seven fruit object images 312 displayed in red and three fruit object images 312 displayed in white because twenty-seven users out of the thirty users belonging to the first group are at work.

Almost all the users belonging to the first group are at work in the first time period from 8:00 to 16:00, so that almost all the fruit object images 312 are displayed in red. The presentation target user can check how many other users are currently at work by checking the number of fruit object images 312 displayed on the display device 25.

Although the display mode determination unit 105 displays the fruit object image 312 corresponding to the user who is not at work in white in the first embodiment, the present disclosure is not particularly limited thereto, and the fruit object image 312 corresponding to the user who is not at work may not be displayed. The display mode determination unit 105 may also display the fruit object image 312 corresponding to the user who is not at work in a color (e.g., black) different from the color (e.g., red) of the fruit object image 312 corresponding to the user who is at work and the color (e.g., green) of the fruit object image 312 corresponding to the user who performs a predetermined action outside work hours.

As illustrated in FIG. 6, a ratio of the first group to be allocated to the multiple fruit object images 312 is determined to be 50% and a ratio of the second group to be allocated to the multiple fruit object images 312 is determined to be 50% in the second time period from 16:00 to 18:00, for example. Thus, the display modes of the left half of the fruit object images 312 are determined based on the first user situations of the respective multiple users belonging to the first group, and the display modes of the right half of the fruit object images 312 are determined based on the second user situations of the respective multiple users belonging to the second group.

For example, when situations of the thirty users belonging to the first group are associated with the respective fifteen fruit object images 312 on the left side, the display mode determination unit 105 displays the fruit object images 312 in red in accordance with the number of first user situations indicating a situation at work. The fruit object image 312 corresponding to the user who is at work is displayed in red, and the fruit object image 312 corresponding to the user who is not at work is displayed in white.

FIG. 6 shows one fruit object image 312 that is associated with first user situations of respective two users. Thus, when the first user situation of at least one of the two users indicates a situation at work, the corresponding fruit object image 312 is displayed in red, and when each of the first user situations of the respective two users indicates a situation not at work, the corresponding fruit object image 312 is displayed in white. FIG. 6 shows ten fruit object images 312 displayed in red and five fruit object images 312 displayed in white because twenty users out of the thirty users belonging to the first group are at work.

For example, when situations of the thirty users belonging to the second group are associated with the respective fifteen fruit object images 312 on the right side, the display mode determination unit 105 displays the fruit object images 312 in green in accordance with the number of second user situations, each indicating that a user performs the predetermined action outside work hours. Examples of the predetermined action include running. The fruit object image 312 corresponding to the user who is performing running is displayed in green, and the fruit object image 312 corresponding to the user who is not performing running is displayed in white.

FIG. 6 shows one fruit object image 312 that is associated with second user situations of respective two users. Thus, when the second user situation of at least one of the two users indicates a situation of performing running, the corresponding fruit object image 312 is displayed in green, and when each of the second user situations of the respective two users indicates a situation other than performing running, the corresponding fruit object image 312 is displayed in white. FIG. 6 shows eight fruit object images 312 displayed in green and seven fruit object images 312 displayed in white because sixteen users out of the thirty users belonging to the second group are performing running.

The multiple users belonging to the first group include a user who finishes work in the second time period from 16:00 to 18:00, so that the fruit object image 312 in red gradually decreases in number and the fruit object image 312 in white gradually increases in number among the fifteen fruit object images 312 on the left side. In contrast, the multiple users belonging to the second group include a user who starts running in the second time period, so that the fruit object image 312 in green gradually increases in number and the fruit object image 312 in white gradually decreases in number among the fifteen fruit object images 312 on the right side.

The presentation target user can check how many other users are currently at work by checking the number of fruit object images 312 in red displayed on the display device 25. The presentation target user can also check how many other users are currently performing the predetermined action outside work hours by checking the number of fruit object images 312 in green displayed on the display device 25.

Although the display mode determination unit 105 displays the fruit object image 312 corresponding to the user who does not perform the predetermined action outside work hours in white in the first embodiment, the present disclosure is not particularly limited thereto, and the fruit object image 312 corresponding to the user who does not perform the predetermined action outside work hours may not be displayed. The display mode determination unit 105 may also display the fruit object image 312 corresponding to the user who does not perform the predetermined action outside work hours in a color (e.g., black) different from the color (e.g., red) of the fruit object image 312 corresponding to the user who is at work and the color (e.g., green) of the fruit object image 312 corresponding to the user who performs a predetermined action outside work hours.

Although the display mode determination unit 105 displays the corresponding fruit object image 312 in red when the first user situation of at least one of the two users indicates a situation at work in the first embodiment, the present disclosure is not particularly limited thereto. The corresponding fruit object image 312 may be displayed with 100% luminance when the first user situation of each of the two users indicates a situation at work, and the corresponding fruit object image 312 may be displayed with 50% luminance when the first user situation of one of the two users indicates a situation at work. Similarly, the display mode determination unit 105 may display the corresponding fruit object image 312 with 100% luminance when the second user situation of each of the two users indicates a situation of running, and may display the corresponding fruit object image 312 with 50% luminance when the second user situation of one of the two users indicates a situation of running.

As illustrated in FIG. 7, a ratio of the second group to be allocated to the multiple fruit object images 312 is determined to be 100% in the third time period from 18:00 to 23:00, for example. Thus, a display mode of the multiple fruit object images 312 is determined based on the second user situations of the respective multiple users belonging to the second group. For example, when situations of the thirty users belonging to the second group are associated with the respective thirty fruit object images 312, the display mode determination unit 105 displays the fruit object images 312 in green in accordance with the number of second user situations, each indicating that a user performs the predetermined action outside work hours. Examples of the predetermined action include running. The fruit object image 312 corresponding to the user who is performing running is displayed in green, and the fruit object image 312 corresponding to the user who is not performing running is displayed in white. FIG. 7 shows twenty-four fruit object images 312 displayed in green and six fruit object images 312 displayed in white because twenty-four users out of the thirty users belonging to the second group are performing running.

Many users belonging to the second group perform running in the third time period from 18:00 to 23:00, so that many fruit object images 312 are displayed in green. The presentation target user can check how many other users are currently performing running by checking the number of fruit object images 312 displayed on the display device 25.

As described above, as the current time approaches the scheduled work end time, the presentation target user can check that other users gradually finish work, and also check that other users gradually perform a predetermined action outside work hours.

Although the fifteen fruit object images 312 on the left side are associated with the first user situation, and the fifteen fruit object images 312 on the right side are associated with the second user situation in the example illustrated in FIG. 6, the present disclosure is not particularly limited thereto, and fifteen fruit object images 312 may be randomly selected from the thirty fruit object images 312 while being associated with the first user situation, and the remaining fifteen fruit object images 312 may be associated with the second user situation.

When one fruit object image 312 is associated with the first user situation or the second user situation of one user, the association between the fruit object image 312 and the first user situation or the second user situation may be randomly changed.

The number of multiple fruit object images 312 to be displayed may be fixed in advance, or may be changed in accordance with the number of multiple users belonging to the first group or the second group. For example, when the number of multiple users belonging to the first group is thirty, thirty fruit object images 312 may be displayed, and when the number of multiple users belonging to the first group is fifteen, fifteen fruit object images 312 may be displayed.

Although the multiple display objects include respective multiple object images displayed on the screen in the first embodiment, the present disclosure is not particularly limited thereto, and a modification of the first embodiment may allow the multiple display objects to include respective multiple light emitting diodes that can be individually controlled to light up.

Figure 8:
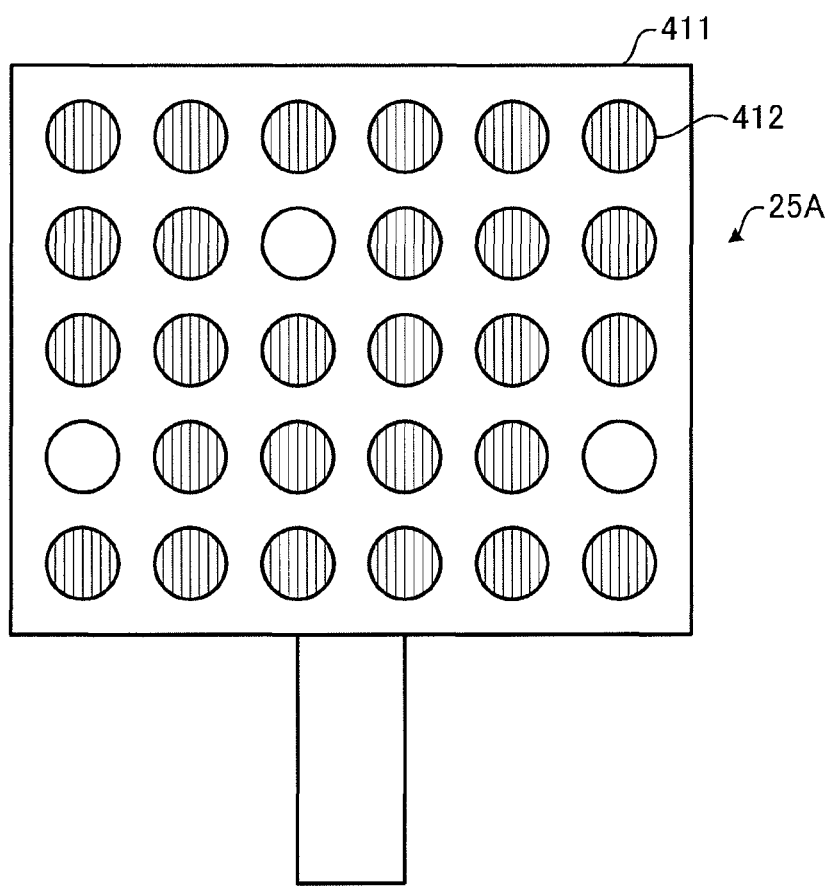
FIG. 8 is a diagram illustrating an example of multiple display objects displayed on a display device in a first time period in a modification of the first embodiment.

FIG. 8 is a diagram illustrating an example of multiple display objects displayed on a display device 25A in the first time period in the modification of the first embodiment.

The display device 25A includes a body 411 imitating a tree, and multiple light emitting diodes 412, each imitating a fruit and being attached to a surface of the body 411. The multiple light emitting diodes 412 can be individually controlled to light up. The example illustrated in FIG. 8 shows thirty light emitting diodes 412 attached to the body 411. The multiple light emitting diodes 412 are examples of multiple display objects and represent situations of respective multiple users.

The display device 25A is connected to the user terminal 2. The processor 21 of the user terminal 2 controls lighting of each light emitting diode 412 of the display device 25A according to setting information received from the server 1. One light emitting diode 412 may include a red light emitting diode, a green light emitting diode, and a blue light emitting diode. This enables the light emitting diode 412 to light up in multiple colors. The light emitting diode 412 may be a monochromatic light emitting diode.

As illustrated in FIG. 8, a ratio of the first group to be allocated to the multiple light emitting diodes 412 is determined to be 100% in the first time period from 8:00 to 16:00, for example. Thus, a display mode of the multiple light emitting diodes 412 is determined based on the first user situations of the respective multiple users belonging to the first group. For example, when situations of the thirty users belonging to the first group are associated with the respective thirty light emitting diodes 412, the display mode determination unit 105 causes the light emitting diodes 412 to light up in red in accordance with the number of first user situations indicating a situation at work. The light emitting diode 412 corresponding to a user who is at work is lit up in red, and the light emitting diode 412 corresponding to a user who is not at work is not lit up. FIG. 8 shows twenty-seven light emitting diodes 412 that are lit up in red and three light emitting diodes 412 that are not lit up because twenty-seven users out of the thirty users belonging to the first group are at work.

For example, a ratio of the first group to be allocated to the multiple light emitting diodes 412 is determined to be 50% and a ratio of the second group to be allocated to the multiple light emitting diodes 412 is determined to be 50% in the second time period from 16:00 to 18:00. Thus, the display modes of the left half of the light emitting diodes 412 are determined based on the first user situations of the respective multiple users belonging to the first group, and the display modes of the right half of the light emitting diodes 412 are determined based on the second user situations of the respective multiple users belonging to the second group.

For example, when situations of the thirty users belonging to the first group are associated with the respective fifteen light emitting diodes 412 on the left side, the display mode determination unit 105 causes the light emitting diodes 412 to light up in red in accordance with the number of first user situations indicating a situation at work. The light emitting diode 412 corresponding to a user who is at work is lit up in red, and the light emitting diode 412 corresponding to a user who is not at work is not lit up.

When the first user situations of respective two users are associated with one light emitting diode 412, the first user situation of at least one of the two users, indicating a situation at work, causes the corresponding light emitting diode 412 to light up in red, and the first user situations of the respective two users, each indicating a situation other than at work, cause the corresponding light emitting diode 412 not to light up. When twenty users out of the thirty users belonging to the first group are at work, ten light emitting diodes 412 are displayed in red, and five light emitting diodes 412 are not lit up.

For example, when situations of the thirty users belonging to the second group are associated with the respective fifteen light emitting diodes 412 on the right side, the display mode determination unit 105 displays the light emitting diodes 412 in green in accordance with the number of second user situations, each indicating that a user performs the predetermined action outside work hours. Examples of the predetermined action include running. The light emitting diode 412 corresponding to a user who is performing running is lit up in green, and the light emitting diode 412 corresponding to a user who is not performing running is not lit up.

When the second user situations of respective two users are associated with one light emitting diode 412, the second user situation of at least one of the two users, indicating a situation of performing running, causes the corresponding light emitting diode 412 to light up in green, and the second user situations of the respective two users, each indicating a situation other than performing running, cause the corresponding light emitting diode 412 not to light up. When sixteen users out of the thirty users belonging to the second group are performing running, eight light emitting diodes 412 are lit up in green, and seven light emitting diodes 412 are not lit up.

Although the display mode determination unit 105 does not light up the light emitting diode 412 corresponding to the first user situation indicating a situation other than at work and the light emitting diode 412 corresponding to the second user situation indicating a situation other than performing the predetermined action outside work hours in the modification of the first embodiment, the present disclosure is not particularly limited thereto, and the light emitting diode 412 may be lit up in another color different from red and green.

Although the display mode determination unit 105 lights up the corresponding light emitting diode 412 in red when the first user situation of at least one of the two users indicates a situation at work in the modification of the first embodiment, the present disclosure is not particularly limited thereto. The corresponding light emitting diode 412 may be lit up with 100% luminance when the first user situation of each of the two users indicates a situation at work, and the corresponding light emitting diode 412 may be lit up with 50% luminance when the first user situation of one of the two users indicates a situation at work.

For example, a ratio of the second group to be allocated to the multiple light emitting diodes 412 is determined to be 100% in the third time period from 18:00 to 23:00. Thus, a display mode of the multiple light emitting diodes 412 is determined based on the second user situations of the respective multiple users belonging to the second group. For example, when situations of the thirty users belonging to the second group are associated with the respective thirty light emitting diodes 412, the display mode determination unit 105 lights up the light emitting diodes 412 in green in accordance with the number of second user situations, each indicating that a user performs the predetermined action outside work hours. Examples of the predetermined action include running. The light emitting diode 412 corresponding to a user who is performing running is lit up in green, and the light emitting diode 412 corresponding to a user who is not performing running is not lit up. When twenty-four users out of the thirty users belonging to the second group are performing running, twenty-four light emitting diodes 412 are lit up in green, and six light emitting diodes 412 are not lit up.

Although the fifteen light emitting diodes 412 on the left side are associated with the first user situation, and the fifteen light emitting diodes 412 on the right side are associated with the second user situation in the example illustrated in FIG. 8, the present disclosure is not particularly limited thereto, and fifteen light emitting diodes 412 may be randomly selected from the thirty light emitting diodes 412 while being associated with the first user situation, and the remaining fifteen light emitting diodes 412 may be associated with the second user situation.

Second Embodiment

Although the ratio of each of the first group and the second group to be allocated to the multiple display objects are determined according to the schedule information in the first embodiment, the ratio of each of the first group and the second group to be allocated to the multiple display objects are determined according to a third user situation indicating a situation of the presentation target user in a second embodiment.

Figure 9:
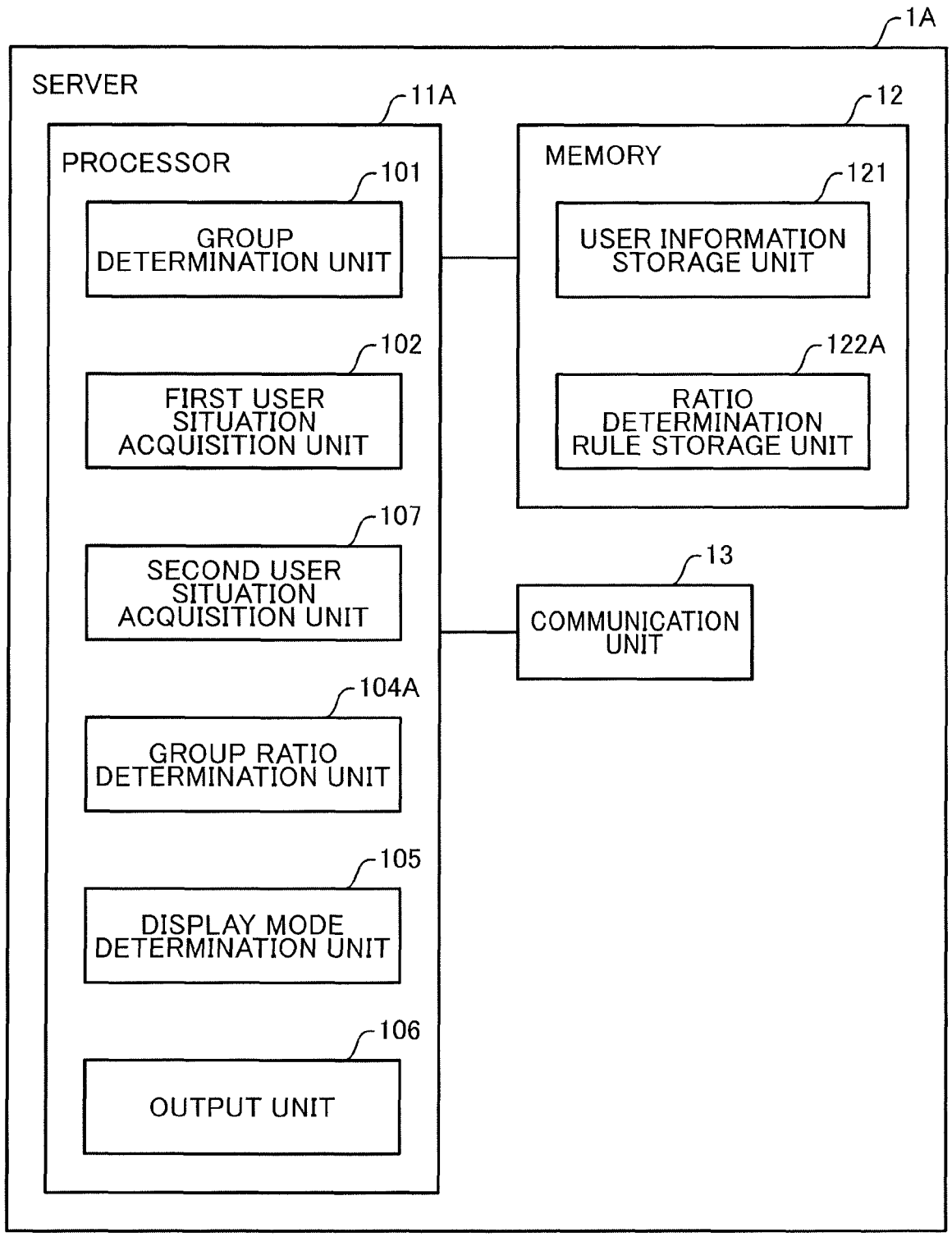
FIG. 9 is a diagram illustrating an example of a configuration of a server according to a second embodiment of the present disclosure.

FIG. 9 is a diagram illustrating an example of a configuration of a server 1A according to the second embodiment of the present disclosure. An information presentation system and a user terminal in the second embodiment are identical in configurations to the information presentation system and the user terminal in the first embodiment.

The server 1A illustrated in FIG. 9 includes a processor 11A, a memory 12A, and a communication unit 13. The second embodiment includes components identical to those in the first embodiment, which are denoted by the same reference signs as those in the first embodiment and will not be described.

The processor 11A implements a group determination unit 101, a first user situation acquisition unit 102, a group ratio determination unit 104A, a display mode determination unit 105, an output unit 106, and a second user situation acquisition unit 107.

The memory 12A implements a user information storage unit 121 and a ratio determination rule storage unit 122A.

The second user situation acquisition unit 107 acquires the third user situation indicating a situation of the presentation target user to whom a situation of another user is presented by a display device 25. The communication unit 24 of the user terminal 2 transmits the third user situation indicating a situation of the presentation target user to the server 1A. The communication unit 13 receives the third user situation from the user terminal 2 used by the presentation target user. The second user situation acquisition unit 107 acquires the third user situation from the communication unit 13. The third user situation indicates whether the presentation target user is at work or whether the presentation target user performs a predetermined action to be performed outside work hours.

Although the communication unit 13 receives the third user situation from the user terminal 2 in the second embodiment, the present disclosure is not particularly limited thereto, and the communication unit 13 may receive the third user situation from another device having collected the third user situation from the user terminal 2. For example, when a management server manages information on attendance of a user, the communication unit 13 may receive the third user situation from the management server.

The group ratio determination unit 104A determines a ratio of each of the first group and the second group to be allocated to the multiple display objects according to the third user situation acquired by the second user situation acquisition unit 107.

The ratio determination rule storage unit 122A stores in advance a ratio determination rule in which ratio conditions determined according to the third user situation of the presentation target user is associated with the ratio of each of the first group and the second group to be allocated to the multiple display objects.

FIG. 10 is a diagram illustrating an example of the ratio determination rule stored in the ratio determination rule storage unit 122A according to the second embodiment.

As illustrated in FIG. 10, all (100%) of the multiple display objects is allocated to the first group in first ratio conditions. The first ratio conditions are set such that the third user situation indicates a situation at work and the number of users indicated to be at work by the multiple first user situations acquired is larger than the number of users at a first ratio of all users belonging to the first group. The first ratio is 70%, for example. When the third user situation and the first user situation satisfy the first ratio conditions, or when the third user situation indicates a situation at work and the number of users indicated to be at work by the multiple first user situations acquired is larger than the number of users at the first ratio of all the users belonging to the first group, the display modes of all of the multiple display objects are determined according to the first user situations of the respective multiple users belonging to the first group.

Second ratio conditions are set such that 50% of the multiple display objects is allocated to the first group, and the remaining 50% of the multiple display objects is allocated to the second group. The second ratio conditions are set such that the third user situation indicates a situation at work and the number of users indicated to be at work by the multiple first user situations acquired is larger than the number of users at a second ratio of all the users belonging to the first group and is equal to or smaller than the number of users at the first ratio thereof. The second ratio is 30%, for example. When the third user situation and the first user situation satisfy the second ratio conditions, or when the third user situation indicates a situation at work and the number of users indicated to be at work by the multiple first user situations acquired is larger than the number of users at the second ratio of all the users belonging to the first group and is equal to or smaller than the number of users at the first ratio thereof, the display modes of half of the multiple display objects are determined according to the first user situations of the respective multiple users belonging to the first group, and the display modes of the remaining half of the multiple display objects are determined according to the second user situations of the respective multiple users belonging to the second group.

All (100%) of the multiple display objects is allocated to the second group in third ratio conditions. The third ratio conditions are set such that the third user situation indicates a situation at work and the number of users indicated to be at work by the multiple first user situations acquired is equal to or smaller than the number of users at the second ratio of all the users belonging to the first group. When the third user situation and the first user situation satisfy the third ratio conditions, or when the third user situation indicates a situation at work and the number of users indicated to be at work by the multiple first user situations acquired is equal to or smaller than the number of users at the second ratio of all the users belonging to the first group, the display modes of all of the multiple display objects are determined according to the second user situations of the respective multiple users belonging to the second group.

When the third user situation indicates a situation at work and the number of users indicated to be at work by the multiple first user situations acquired is larger than the number of users at the first ratio (70%) of all the users belonging to the first group, the group ratio determination unit 104A increases the ratio of the first group to larger than the ratio of the second group. Specifically, when the third user situation indicates a situation at work and the number of users indicated to be at work by the multiple first user situations acquired is larger than the number of users at the first ratio (70%) of all the users belonging to the first group, the group ratio determination unit 104A sets the ratio of the first group to 100% and the ratio of the second group to 0% with reference to the ratio determination rule stored in the ratio determination rule storage unit 122A.

When the third user situation indicates a situation at work and the number of users indicated to be at work by the multiple first user situations acquired is larger than the number of users at the second ratio (30%) of all the users belonging to the first group and is equal to or smaller than the number of users at first ratio (70%) thereof, the group ratio determination unit 104A sets the ratio of each of the first group and the second group to 50% with reference to the ratio determination rule stored in the ratio determination rule storage unit 122A.

When the third user situation indicates a situation at work and the number of users indicated to be at work by the multiple first user situations acquired is equal to or smaller than the number of users at the second ratio (30%) of all the users belonging to the first group, the group ratio determination unit 104A increases the ratio of the second group to larger than the ratio of the first group. Specifically, when the third user situation indicates a situation at work and the number of users indicated to be at work by the multiple first user situations acquired is equal to or smaller than the number of users at the second ratio (30%) of all the users belonging to the first group, the group ratio determination unit 104A sets the ratio of the second group to 100% and the ratio of the first group to 0% with reference to the ratio determination rule stored in the ratio determination rule storage unit 122A.

Although the group ratio determination unit 104A sets the ratio of the first group to 100% when the third user situation indicates a situation at work and the number of users indicated to be at work by the multiple first user situations acquired is larger than the number of users at the first ratio (70%) of all the users belonging to the first group in the second embodiment, the present disclosure is not particularly limited thereto, and the ratio of the first group may only be set larger than the ratio of the second group. For example, when the third user situation indicates a situation at work and the number of users indicated to be at work by the multiple first user situations acquired is larger than the number of users at the first ratio (70%) of all the users belonging to the first group, the group ratio determination unit 104A may set the ratio of the first group to 90% and the ratio of the second group to 10%.

Although the group ratio determination unit 104A sets the ratio of the second group to 100% when the third user situation indicates a situation at work and the number of users indicated to be at work by the multiple first user situations acquired is equal to or smaller than the number of users at the second ratio (30%) of all the users belonging to the first group, the present disclosure is not particularly limited thereto, and the ratio of the second group may only be set larger than the ratio of the first group. For example, when the third user situation indicates a situation at work and the number of users indicated to be at work by the multiple first user situations acquired is equal to or smaller than the number of users at the second ratio (30%) of all the users belonging to the first group, the group ratio determination unit 104A may set the ratio of the second group to 90% and the ratio of the first group to 10%.

Subsequently, information presentation processing with the server 1A according to the second embodiment of the present disclosure will be described.

Figure 11:
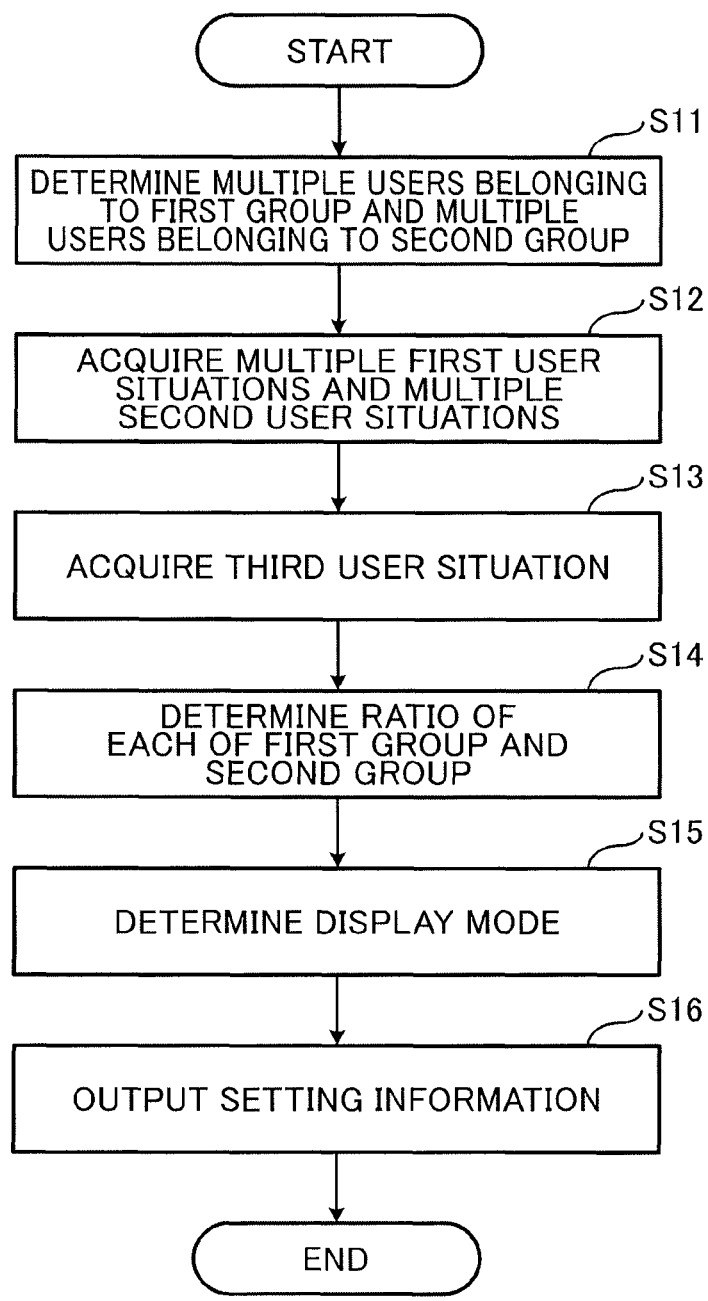
FIG. 11 is a flowchart for illustrating information presentation processing with the server according to the second embodiment of the present disclosure.

FIG. 11 is a flowchart for illustrating the information presentation processing with the server 1A according to the second embodiment of the present disclosure.

The processing in steps S11 and S12 is the same as the processing in steps S1 and S2 illustrated in FIG. 4, and thus will not be described.

In subsequent step S13, the second user situation acquisition unit 107 acquires the third user situation indicating a situation of the presentation target user.

In subsequent step S14, the group ratio determination unit 104A determines a ratio of each of the first group and the second group to be allocated to the multiple display objects according to the third user situation acquired by the second user situation acquisition unit 107.

The processing in steps S15 and S16 is the same as the processing in steps S5 and S6 illustrated in FIG. 4, and thus will not be described.

As described above, the ratio of the first group and the second group to be allocated to the multiple display objects is determined according to the third user situation indicating the situation of the presentation target user; the display mode of each of the multiple first display objects allocated to the first group in accordance with the determined ratio is determined based on the multiple first user situations of the respective multiple users belonging to the first group; the display mode of each of the multiple second display objects allocated to the second group in accordance with the determined ratio is determined based on the multiple second user situations of the respective multiple users belonging to the second group; and the multiple first display objects and the multiple second display objects are displayed in the determined display mode.

Thus, the presentation target user can know the situations of the respective multiple users belonging to the first group and the situations of the respective multiple users belonging to the second group by checking the display modes of the displayed multiple first display objects and second display objects, so that the situations of other users can be presented to the presentation target user without individually identifying the other users.

The user terminal 2 in the second embodiment may receive the ratio determination rule selected between the ratio determination rule in the first embodiment and the ratio determination rule in the second embodiment by the user, the ratio determination rule being to be used by the group ratio determination unit 104A. With this configuration, the ratio determination rule in the first embodiment and the ratio determination rule in the second embodiment to be manually switched.

The server 1A may include a schedule information acquisition unit 103 in the second embodiment. When the third user situation acquired by the second user situation acquisition unit 107 coincides with the schedule information acquired by the schedule information acquisition unit 103, the group ratio determination unit 104A may determine the ratio of each of the first group and the second group to be allocated to the multiple display objects using the ratio determination rule in the first embodiment. When the third user situation acquired by the second user situation acquisition unit 107 is different from the schedule information acquired by the schedule information acquisition unit 103, the group ratio determination unit 104A may switch the ratio determination rule used by the group ratio determination unit 104A from the ratio determination rule in the first embodiment to the ratio determination rule in the second embodiment. For example, when the third user situation indicates a situation other than at work and the schedule information indicates a situation at work, the group ratio determination unit 104A may switch the ratio determination rule used by the group ratio determination unit 104A from the ratio determination rule in the first embodiment to the ratio determination rule in the second embodiment.

The server 1A in the second embodiment may include a stress value acquisition unit that acquires a stress value of the presentation target user. The user terminal 2 may detect a heart rate of the presentation target user and calculate the stress value from the detected heart rate. The stress value acquisition unit acquires the stress value calculated by the user terminal 2.

When the stress value acquired by the stress value acquisition unit is equal to or less than a predetermined value, the group ratio determination unit 104A may determine a ratio of each of the first group and the second group to be allocated to the multiple display objects using the ratio determination rule in the first embodiment. When the stress value acquired by the stress value acquisition unit is higher than the predetermined value, the group ratio determination unit 104A may switch the ratio determination rule used by the group ratio determination unit 104A from the ratio determination rule in the first embodiment to the ratio determination rule in the second embodiment.

The display mode determination unit 105 may also give a point according to a length of time during which the first user situation indicating a situation at work is continuously acquired or a length of time during which the second user situation indicating that the user performs a predetermined action to be performed outside work hours is continuously acquired to change luminance of the first display object or the second display object in accordance with the given point. For example, the display mode determination unit 105 may give one point when the length of time during which the first user situation indicating a situation at work is continuously acquired is shorter than a predetermined time, and may give two points when the length of time during which the first user situation indicating a situation at work is continuously acquired is equal to or longer than the predetermined time. Then, the display mode determination unit 105 may display the first display object with 50% luminance when one point is given, and may display the first display object with 100% luminance when two points are given.

The first and second embodiments each may be configured such that the display mode determination unit 105 calculates a ratio of the number of first user situations, each indicating a situation at work, to the number of all users belonging to the first group at predetermined time intervals, and gradually changes luminance of the first display object after the predetermined time to cause the first display object to have luminance in accordance with the calculated ratio.

Figure 12:
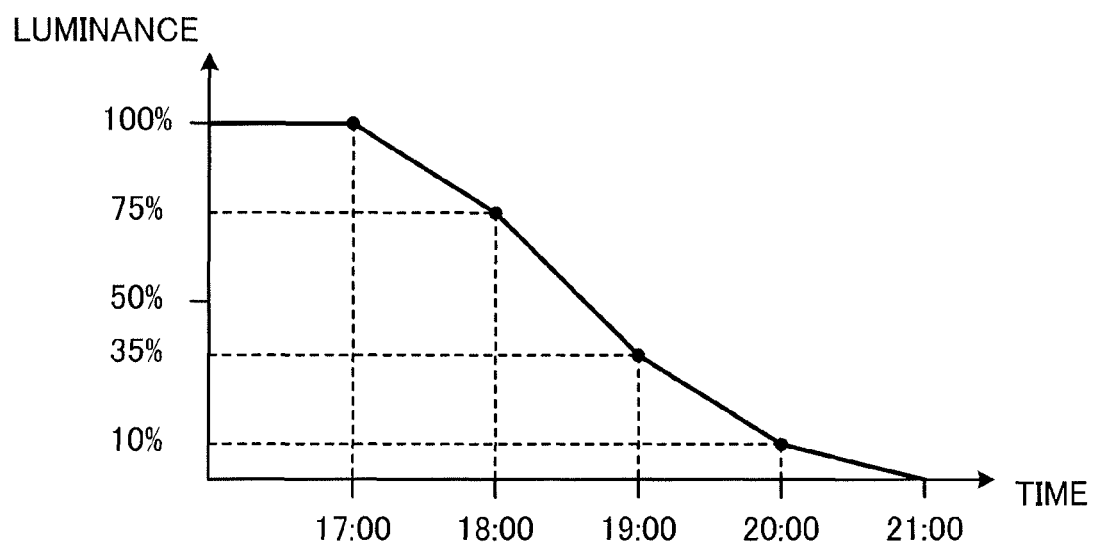
FIG. 12 is a diagram for illustrating a display mode in which luminance of multiple first display objects is gradually changed in the first and second embodiments.

FIG. 12 is a diagram for illustrating a display mode in which luminance of multiple first display objects is gradually changed in the first and second embodiments. In FIG. 12, the vertical axis represents luminance, and the horizontal axis represents time.

For example, the display mode determination unit 105 calculates the ratio of the number of first user situations, each indicating a situation at work, to the number of all the users belonging to the first group every hour. For example, the number of all the users belonging to the first group is twenty. When the number of first user situations indicating, each indicating a situation at work, decreases from twenty to fifteen at 17:00, the ratio of the number of first user situations, each indicating a situation at work, to the number of all the users belonging to the first group becomes 75%. The display mode determination unit 105 gradually decreases luminance of the multiple first display objects from 100% so that the luminance of the multiple first display objects become 75% by 18:00 at which the ratio is next calculated.

Subsequently, when the number of first user situations indicating, each indicating a situation at work, decreases from fifteen to seven at 18:00, the ratio of the number of first user situations indicating, each indicating a situation at work, to the number of all the users belonging to the first group becomes 35%. The display mode determination unit 105 gradually decreases the luminance of the multiple first display objects from 75% so that the luminance of the multiple first display objects become 35% by 19:00 at which the ratio is next calculated.

Subsequently, when the number of first user situations indicating, each indicating a situation at work, decreases from seven to two at 19:00, the ratio of the number of first user situations indicating, each indicating a situation at work, to the number of all the users belonging to the first group becomes 10%. The display mode determination unit 105 gradually decreases the luminance of the multiple first display objects from 35% so that the luminance of the multiple first display objects become 10% by 20:00 at which the ratio is next calculated.

Subsequently, when the number of first user situations indicating, each indicating a situation at work, decreases from two to zero at 20:00, the ratio of the number of first user situations indicating, each indicating a situation at work, to the number of all the users belonging to the first group becomes 0%. The display mode determination unit 105 gradually decreases the luminance of the multiple first display objects from 10% so that the luminance of the multiple first display objects become 0% by 21:00 at which the ratio is next calculated.

The luminance of the multiple first display objects may be set to 100% when the number of first user situations indicating, each indicating a situation at work, exceeds a predetermined number. For example, when the number of all the users belonging to the first group is twenty and the number of first user situations indicating, each indicating a situation at work, is equal to or more than fifteen that is 75% of the total number, the display mode determination unit 105 sets the luminance of the multiple first display objects to 100%.

In each of the above embodiments, each component may be implemented by being configured with dedicated hardware or by executing a software program suitable for each component. Each component may be implemented by a program execution unit such as a CPU or a processor reading and executing a software program recorded on a recording medium such as a hard disk or a semiconductor memory. Alternatively, the program may be executed by another independent computer system by recording and transferring the program on a recording medium or transferring the program via a network.

Some or all of the functions of the devices according to the embodiments of the present disclosure are implemented as large scale integration (LSI), which is typically an integrated circuit. These may be individually integrated into one chip, or may be integrated into one chip so as to include some or all of them. The integrated circuit is not limited to the LSI, and may be implemented by a dedicated circuit or a general-purpose processor. The integrated circuit may use a field programmable gate array (FPGA) that can be programmed after manufacturing of LSI or a reconfigurable processor in which connections and settings of circuit cells inside LSI can be reconfigured.

Some or all of the functions of the devices according to the embodiments of the present disclosure may be implemented by execution of a program with a processor such as a CPU.

The numbers used above are merely examples for specifically describing the present disclosure, and the present disclosure is not limited to the illustrated numbers.

The flowcharts above each illustrate the steps to be performed in order as an example for specifically describing the present disclosure, so that the steps may be performed in order different from the order above as long as the effect of the present disclosure can be similarly obtained. Some of the above steps may be executed simultaneously (concurrently) with another step.

The technique according to the present disclosure can present a situation of another user to a presentation target user without individually identifying the other user, and thus is useful as a technique for presenting a situation of another user to a presentation target user.

The invention claimed is:

1. An information processing method comprising, by a computer:
    acquiring a first user situation indicating a situation of each of multiple users belonging to a first group and a second user situation indicating a situation of each of multiple users belonging to a second group different from the first group;
    acquiring a third user situation indicating a situation of a presentation target user who presents a situation of another user using a display device including multiple display objects or schedule information on the presentation target user;
    determining a ratio of each of the first group and the second group to be allocated to the multiple display objects according to the acquired third user situation or the schedule information;
    determining a display mode of each of multiple first display objects allocated to the first group in accordance with the determined ratio based on the acquired multiple first user situations, and determining a display mode of each of multiple second display objects allocated to the second group in accordance with the determined ratio based on the acquired multiple second user situations; and
    outputting setting information for displaying the multiple first display objects and the multiple second display objects in the determined display mode.

2. The information processing method according to claim 1, further comprising:
    determining the multiple users belonging to the first group based on an attribute related to work of the presentation target user, and determining the multiple users belonging to the second group based on a predetermined action of the presentation target user performed outside work hours.

3. The information processing method according to claim 1, wherein
    the first user situation indicates whether each of the multiple users belonging to the first group is at work, and
    the second user situation indicates whether each of the multiple users belonging to the second group performs a predetermined action to be performed outside work hours.

4. The information processing method according to claim 1, wherein
    in the determining the ratio,
    a first time period, a second time period after the first time period, and a third time period after the second time period are determined according to the schedule information,
    a ratio of the first group is set to be larger than a ratio of the second group when a current time is in the first time period,
    the ratio of the first group and the ratio of the second group are each set to be 50% when the current time is in the second time period, and
    the ratio of the second group is set to be larger than the ratio of the first group when the current time is in the third time period.

5. The information processing method according to claim 3, wherein
    in the determining the ratio,
    the ratio of the first group is set to be larger than the ratio of the second group when the third user situation indicates a situation at work, and the number of users indicated to be at work by the multiple first user situations acquired is larger than the number of users at a first ratio of all users belonging to the first group,
    the ratio of the first group and the ratio of the second group are each set to be 50% when the third user situation indicates a situation at work, and the number of users indicated to be at work by the multiple first user situations acquired is larger than the number of users at a second ratio of all the users belonging to the first group and is equal to or smaller than the number of users at the first ratio of all the users belonging to the first group, and
    the ratio of the second group is set to be larger than the ratio of the first group when the third user situation indicates a situation at work, and the number of users indicated to be at work by the multiple first user situations acquired is equal to or smaller than the number of users at the second ratio of all the users belonging to the first group.

6. The information processing method according to claim 1, wherein
luminance of each of the multiple display objects is adjustable, and
in the determining the display mode,
the multiple first display objects include the first display object that is to be displayed with luminance of a predetermined value or more and that is determined based on the multiple first user situations acquired, and
the multiple second display objects include the second display object that is to be displayed with luminance of a predetermined value or more and that is determined based on the multiple second user situations acquired.

7. The information processing method according to claim 6, wherein the multiple display objects include respective multiple light emitting diodes that are individually controllable for lighting.

8. The information processing method according to claim 6, wherein the multiple display objects include respective multiple object images that are displayed on a screen.

9. The information processing method according to claim 1, wherein
the display mode of one of the multiple first display objects is determined based on the first user situations of two or more of the multiple users belonging to the first group, and
the display mode of one of the multiple second display objects is determined based on the second user situations of two or more of the multiple users belonging to the second group.

10. The information processing method according to claim 1, wherein
the display mode of two or more of the multiple first display objects is determined based on the first user situation of one user of the multiple users belonging to the first group, and
the display mode of two or more of the multiple second display objects is determined based on the second user situation of one user of the multiple users belonging to the second group.

11. The information processing method according to claim 1, wherein in the determining the display mode, a color of the first display object is made different from a color of the second display object.

12. An information processing device comprising:
a first acquisition unit configured to acquire a first user situation indicating a situation of each of multiple users belonging to a first group and a second user situation indicating a situation of each of multiple users belonging to a second group different from the first group;
a second acquisition unit configured to acquire a third user situation indicating a situation of a presentation target user who presents a situation of another user using a display device including multiple display objects or schedule information on the presentation target user;
a first determination unit configured to determine a ratio of each of the first group and the second group to be allocated to the multiple display objects according to the acquired third user situation or the schedule information;
a second determination unit configured to determine a display mode of each of multiple first display objects allocated to the first group in accordance with the determined ratio based on the acquired multiple first user situations, and determine a display mode of each of multiple second display objects allocated to the second group in accordance with the determined ratio based on the acquired multiple second user situations; and
an output unit configured to output setting information for displaying the multiple first display objects and the multiple second display objects in the determined display mode.

13. A non-transitory computer readable recording medium storing an information processing program that causes a computer to execute functions of:
acquiring a first user situation indicating a situation of each of multiple users belonging to a first group and a second user situation indicating a situation of each of multiple users belonging to a second group different from the first group;
acquiring a third user situation indicating a situation of a presentation target user who presents a situation of another user using a display device including multiple display objects or schedule information on the presentation target user;
determining a ratio of each of the first group and the second group to be allocated to the multiple display objects according to the acquired third user situation or the schedule information;
determining a display mode of each of multiple first display objects allocated to the first group in accordance with the determined ratio based on the acquired multiple first user situations, and determining a display mode of each of multiple second display objects allocated to the second group in accordance with the determined ratio based on the acquired multiple second user situations; and
outputting setting information for displaying the multiple first display objects and the multiple second display objects in the determined display mode.

14. An information processing method comprising, by a computer:
acquiring a first selection condition for selecting multiple users belonging to a first group and a second selection condition for selecting multiple users belonging to a second group different from the first group;
acquiring a situation of a presentation target user to whom a situation of another user is presented by a display device including multiple display objects or schedule information on the presentation target user; and
outputting a ratio of each of the first group and the second group to be allocated to the multiple display objects according to the situation of the presentation target user or the schedule information, a display mode of each of multiple first display objects allocated to the first group based on situations of the multiple users belonging to the first group, and a display mode of each of multiple second display objects allocated to the second group based on situations of the multiple users belonging to the second group.

* * * * *